United States Patent
Nakamura et al.

(10) Patent No.: US 8,160,814 B2
(45) Date of Patent: Apr. 17, 2012

(54) MAP DISTRIBUTION SYSTEMS, METHODS AND PROGRAMS

(75) Inventors: Norihiro Nakamura, Toyokawa (JP);
Yoriyuki Nagata, Okazaki (JP);
Hironobu Sugimoto, Toyota (JP);
Tomoki Kodan, Nagoya (JP)

(73) Assignees: Aisin AW Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 555 days.

(21) Appl. No.: 12/309,228

(22) PCT Filed: Jul. 9, 2007

(86) PCT No.: PCT/JP2007/064041
§ 371 (c)(1),
(2), (4) Date: Feb. 10, 2009

(87) PCT Pub. No.: WO2008/007793
PCT Pub. Date: Jan. 17, 2008

(65) Prior Publication Data
US 2009/0292458 A1      Nov. 26, 2009

(30) Foreign Application Priority Data

Jul. 10, 2006  (JP) ................................. 2006-189613
Jul. 10, 2006  (JP) ................................. 2006-189615

(51) Int. Cl.
*G01C 21/30*      (2006.01)

(52) U.S. Cl. ......... 701/409; 701/408; 701/467; 701/516
(58) Field of Classification Search ........... 701/200–226
See application file for complete search history.

(56) References Cited

U.S. PATENT DOCUMENTS

| | | | |
|---|---|---|---|
| 2006/0080030 A1 | 4/2006 | Okude et al. | |
| 2007/0032949 A1* | 2/2007 | Arai et al. | 701/211 |
| 2007/0233369 A1* | 10/2007 | Ng et al. | 701/208 |

FOREIGN PATENT DOCUMENTS

| | | |
|---|---|---|
| EP | 1 770 366 A1 | 4/2007 |
| JP | A-2002-188926 | 7/2002 |

(Continued)

OTHER PUBLICATIONS

Japanese Patent Office, Notification of Reason(s) for Refusal mailed Jan. 25, 2011 in Japanese Patent Application No. 2006-189613 w/Partial English-language Translation.

(Continued)

*Primary Examiner* — William Allen
(74) *Attorney, Agent, or Firm* — Oliff & Berridge, PLC

(57) ABSTRACT

Map information distribution systems, methods, and programs that update map information based and distribute the update information, send update request information for requesting the update information of the map information, receive the update request information, and obtain the update information corresponding to the received update request information. The systems, methods, and programs obtain updated content corresponding to the obtained update information, assign a score to the updated content based on factor information corresponding to the obtained updated content, assign an order of priority to the respective updated content based on the scores assigned to the respective updated content, distribute the update information and the prioritized updated content, update the map information based on the received update information, and notify a user of the received updated content based on the order of priority assigned to the updated content.

5 Claims, 14 Drawing Sheets

FOREIGN PATENT DOCUMENTS

| | | | |
|---|---|---|---|
| JP | A-2003-051094 | | 2/2003 |
| JP | A-2004-012319 | | 1/2004 |
| JP | A-2004-126035 | | 4/2004 |
| JP | A-2005-091225 | | 4/2005 |
| JP | 2006-1266683 | * | 5/2006 |
| JP | A-2006-126683 | | 5/2006 |
| JP | A-2006-162270 | | 6/2006 |
| WO | WO 2006/008826 A1 | | 1/2006 |

OTHER PUBLICATIONS

Japanese Patent Office, Notification of Reason(s) for Refusal mailed Jan. 25, 2011 in Japanese Patent Application No. 2006-189615 w/Partial English-language Translation.

* cited by examiner

FIG. 3

| DISTANCE FROM CENTER POSITION | DISTANCE SCORE |
|---|---|
| LESS THAN 10 SQUARE KILOMETERS | 1 |
| 10 SQUARE KILOMETERS TO LESS THAN 60 SQUARE KILOMETERS | 2 |
| 60 SQUARE KILOMETERS OR MORE | 3 |

FIG. 4

| ROAD RANK | ROAD RANK SCORE |
|---|---|
| METROPOLITAN EXPRESSWAY/ INTER-CITY EXPRESSWAY | 1 |
| TOLL ROAD/ ONE- AND TWO-DIGIT NATIONAL ROADS | 2 |
| THREE-DIGIT NATIONAL ROAD/ PREFECTURAL ROAD | 3 |

FIG. 5

| ROAD UPDATED CONTENT | UPDATED CONTENT SCORE |
|---|---|
| NEWLY-OPENED ROUTE/ ROUTE EXTENSION | 1 |
| TOLL ELIMINATED/ TOLL PARTIALLY ELIMINATED | 2 |
| TOLL REVISED/ ONLY FACILITY CHANGED | 3 |

FIG. 10

| SECTION | Ver | COORDINATES | SPECIFIC DISPLAY CONTENT | ROAD RANK SCORE | UPDATED CONTENT SCORE | DISTANCE SCORE |
|---|---|---|---|---|---|---|
| B | 3 | (X2,Y2) | XX MOTORWAY: TOLL BETWEEN YY AND ZZ HAS BEEN ELIMINATED | 1 | 2 | 1 |
| C | 2 | (X3,Y3) | NATIONAL ROAD AAA: XX TO BB HAS BEEN UPDATED | 3 | 1 | 1 |
| C | 3 | (X4,Y4) | TOLL REVISION ON BB METROPOLITAN EXPRESSWAY HAS BEEN UPDATED | 1 | 3 | 2 |
| D | 2 | (X5,Y5) | AA TOLL ROAD: TOLL BETWEEN BB INTERCHANGE AND CC INTERCHANGE HAS BEEN ELIMINATED | 2 | 2 | 3 |
| E | 3 | (X6,Y6) | AA EXPRESSWAY: CC INTERCHANGE TO BB INTERCHANGE HAS BEEN UPDATED | 1 | 1 | 2 |

61

(ROAD RANK SCORE)$^2$+ (UPDATED CONTENT SCORE)$^2$+ (DISTANCE SCORE)$^2$ (NOTIFICATION IMPORTANCE)$^2$ + (DISTANCE SCORE)$^2$

FIG. 14

| CATEGORY | ORDER OF PRIORITY | SPECIFIC DISPLAY CONTENT 63 |
|---|---|---|
| ROAD | 1 | AA EXPRESSWAY: CC INTERCHANGE TO BB INTERCHANGE HAS BEEN UPDATED |
| ROAD | 2 | NATIONAL ROAD AAA: XX TO BB HAS BEEN UPDATED |
| TOLL | 3 | XX MOTORWAY: TOLL BETWEEN YY AND ZZ HAS BEEN ELIMINATED |
| TOLL | 4 | TOLL REVISION ON BB METROPOLITAN EXPRESSWAY HAS BEEN UPDATED |
| TOLL | 5 | AA TOLL ROAD: TOLL BETWEEN BB INTERCHANGE AND CC INTERCHANGE HAS BEEN ELIMINATED |
| OBJECT | 6 | ZZZ FACILITY HAS BEEN ADDED |
| OBJECT | 7 | AA HIGHWAY OASIS HAS BEEN ADDED |
| OBJECT | 8 | XX SERVICE AREA HAS BEEN ADDED |
| OBJECT | 9 | YY JUNCTION HAS BEEN ADDED |

MAP DISTRIBUTION SYSTEMS, METHODS AND PROGRAMS

INCORPORATION BY REFERENCE

This application is a National Phase of International Patent Application No. PCT/JP2007/064041, filed Jul. 9, 2007, which claims priority of Japanese Patent Application Nos. 2006-189615, filed Jul. 10, 2006, and 2006-189613, filed Jul. 10, 2006. The disclosures of these applications are incorporated herein by reference in their entirety.

BACKGROUND

1. Related Technical Fields

Related technical fields include map information distribution systems, methods, and programs that distribute update information for updating map information from a map information distribution center to a navigation device.

2. Related Art

In recent years, a navigation device is frequently installed in a vehicle to execute guidance for driving the vehicle, so as to make it possible for the driver to reach a desired destination easily. The navigation device is a system that is capable of detecting the vehicle's current position using a GPS receiver or the like, then obtaining map data that corresponds to the current position from a storage medium such as a DVD-ROM, hard disk, or the like, or through a network, and displaying the map data on a liquid crystal display. In addition to reading the map data that includes the vehicle's current position from the storage medium or the like, drawing a map image of the area surrounding the vehicle's current position based on the map data, and displaying the map image on a display system, the navigation device displays a superimposed vehicle position mark on the map image, then scrolls the map image as the vehicle moves or keeps the map image stationary and moves the vehicle position mark, such that the driver can tell at a glance the location where the vehicle is traveling.

New roads are built every year all over Japan. As a result of such construction, an existing road may be eliminated or the path of the existing road may be changed. Accordingly, map data recorded in the navigation device must be updated at somewhat regular time intervals. The updating of map data in such case may be performed by purchasing a new DVD to replace an old DVD, writing map data to the hard disk at a store, or overwriting hard disk content based on map data distributed from a map information distribution center or the like.

There are various map information distribution systems proposed that automatically distribute from a map information distribution center to the navigation device update information for updating map data recorded in the navigation device.

For example, the version of the map information currently held in the navigation device may be sent from the navigation device to a map information distribution center. The map information distribution system is structured such that the navigation device subsequently receives update information for updating map information from the map information distribution center, and updates the map information based on the received update information. Thereafter, the navigation device visibly displays an updated section and a non-updated section, as well as an update timing order, so that these are distinguishable (see Japanese Patent Application Publication No. JP-A-2005-91225, paragraphs [0013] to [0040] and FIGS. 1 to 3 for an example).

SUMMARY

However, according to the map information distribution system described above, newly opened expressways and widening or the like of prefectural roads or the like, for example, are indistinguishable from other sections. And updated portions of narrow streets around town surrounding the user's home are also indistinguishable from, for example, newly opened national expressways, one- and two-digit national roads, and the like. This makes updated content difficult to recognize for the user and makes it difficult for the user to easily confirm the updated content.

Various exemplary implementations of the broad principles of the described herein provide map information distribution systems, methods, and programs that, based on update information a navigation device receives from a map information distribution center, are capable of making it easy for users to confirm the updated content if map information is updated and effectively communicating such content.

Various exemplary implementations provide systems, methods, and programs that update map information based on received update information and distribute the update information. The systems, methods, and programs send update request information for requesting the update information of the map information, receive the update request information, obtain the update information corresponding to the received update request information, and obtain updated content corresponding to the obtained update information. The systems, methods, and programs assign a score to the updated content based on factor information corresponding to the obtained updated content, distribute the update information and the scored updated content, update the map information based on the received update information, and notify a user of the received updated content based on the scores assigned to the updated content.

Various exemplary implementations also provide systems, methods, and programs that update map information based on received update information and distribute the update information to the navigation device. The systems, methods, and programs send update request information for requesting the update information of the map information, receive the update request information, and obtain the update information corresponding to the received update request information. The systems, methods, and programs obtain updated content corresponding to the obtained update information, assign a score to the updated content based on factor information corresponding to the obtained updated content, assign an order of priority to the respective updated content based on the scores assigned to the respective updated content; and distribute the update information and the prioritized updated content to the navigation device. The systems, methods, and programs update the map information based on the received update information and notify a user of the navigation device of the received updated content based on the order of priority assigned to the updated content.

Various exemplary implementations also provide systems, methods, and programs that update map information based on received update information and distribute the update information to the navigation device. The systems, methods, and programs send update request information for requesting the update information of the map information to the map information distribution center, receive the update request information, obtain the update information corresponding to the received update request information, and obtain updated content corresponding to the obtained update information. The systems, methods, and programs distribute the update information and the updated content, update the map information based on the received update information, display a map whose area to be displayed is determined depending on the received updated content, and notify a user of the navigation device of the updated content. The systems, methods, and programs store a preset update point, distribute only the obtained update information to the navigation device if the updated content obtaining section cannot obtain either updated content pertaining to a road of at least a predetermined road category or updated content pertaining to an object of at least a predetermined scale. The systems, methods, and programs, if the update information only has been received, update the map information based on the received update information, and if a map area of the update information is within a predetermined distance from the present update point, display a map surrounding the present update point and notify a user of the navigation device that the map information surrounding the preset update point has been updated.

Various exemplary implementations also provide systems, methods, and programs that send update request information for requesting the update information of the map information, receive the update request information, obtain the update information corresponding to the update request information, and obtain updated content corresponding to the update information. The systems, methods, and programs distribute the update information and the updated content if at least one of the updated content pertaining to a road of at least a predetermined road category and updated content pertaining to an object of at least a predetermined scale, distribute only the update information if either updated content pertaining to a road of at least a predetermined road category or updated content pertaining to an object of at least a predetermined scale cannot be obtained, and receive the update information and the updated content by the navigation device. The systems, methods, and programs update the map information based on the received update information, display a map whose area to be displayed is determined depending on the updated content received, and notify a user of the updated content if the update information and the updated content have been received. The systems, methods, and programs update the map information based on the received update information if the update information only has been received, display a map surrounding the preset update point, and notify a user of the navigation device that the map information surrounding the preset update point has been updated if a map area of the update information is within a predetermined distance from a preset update point.

Various exemplary implementations also provide systems, methods, and programs that send update request information for requesting the update information of the map information, receive the update request information, and obtain the update information corresponding to the update request information. The systems, methods, and programs obtain updated content corresponding to the update information, assign a score to the updated content based on factor information corresponding to the updated content, and distribute the update information and the scored updated content. The systems, methods, and programs receive the update information and the scored updated content, update the map information based on the update information and notify a user of the received updated content based on the scores assigned to the updated content.

Various exemplary implementations also provide systems, methods, and programs that send update request information for requesting the update information of the map information, receive the update request information, and obtain the update information corresponding to the update request information. The systems, methods, and programs obtain updated content corresponding to the update information, assign a score to the updated content based on factor information corresponding to the updated content, and assign an order of priority to the respective updated content based on the scores assigned to the respective updated content. The systems, methods, and programs distribute the update information and the prioritized updated content, receive the update information and the prioritized updated content, update the map information based on the update information, and notify a user of the received updated content based on the order of priority assigned to the updated content.

BRIEF DESCRIPTION OF THE DRAWINGS

Exemplary implementations will now be described with reference to the accompanying drawings, wherein:

FIG. 3 is an example of a distance priority table stored in a priority database of the map information distribution center;

FIG. 4 is an example of a road rank priority table stored in the priority database of the map information distribution center;

FIG. 5 is an example of an updated content priority table stored in the priority database of the map information distribution center;

FIG. 10 is an example of a road notification information table created at step 113;

FIG. 14 is an example of a prioritized notification information table that stores in the order of priority respective notification information stored in the road notification information table and the object notification information table;

DETAILED DESCRIPTION OF EXEMPLARY IMPLEMENTATIONS

Figure 1:
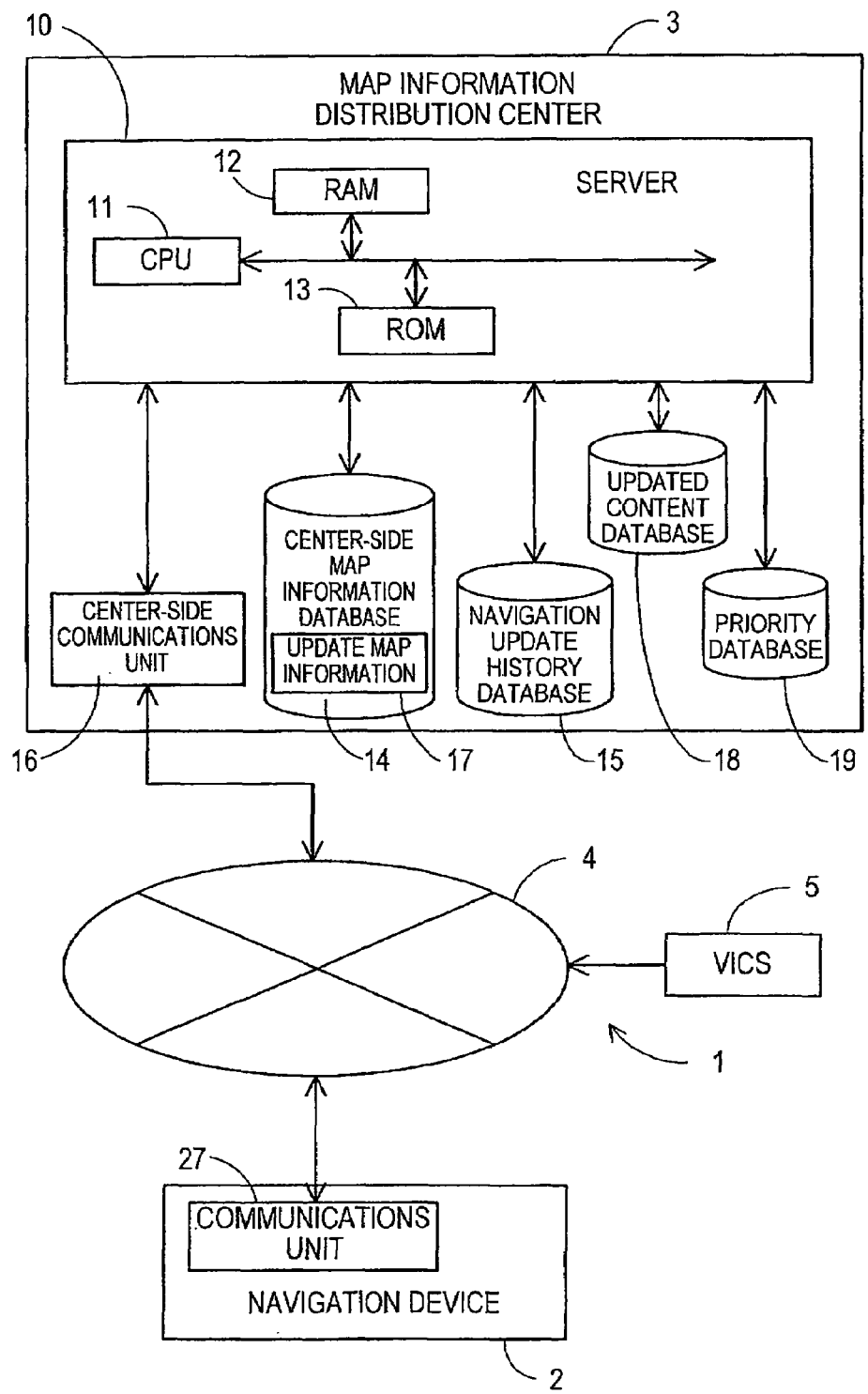
FIG. 1 is a block diagram of an exemplary map information distribution system.

An exemplary map information distribution system will be described in detail. FIG. 1 is a block diagram showing the map information distribution system 1.

As shown in FIG. 1, the exemplary map information distribution system 1 is basically structured from a navigation device 2, a map information distribution center 3, and a network 4. The map information distribution center 3 distributes to the navigation device 2 update information that is structured from updated content and difference data for updating map information. Furthermore, the navigation device 2 and the map information distribution center 3 are structured so as to enable the sending and receiving of various information via the network 4. It should be noted that the structure of the navigation device 2 will be explained in detail later using FIG. 2.

As FIG. 1 also shows, the map information distribution center 3 includes the following: a server 10; a center-side map information database 14 that serves as an information storage unit which is connected to the server 10; a navigation update history database 15; a center-side communications unit 16; an updated content database 18; and a priority database 19. In addition, the server 10 includes controller, such as a CPU 11, a RAM 12, and a ROM 13. The CPU 11 serves as a computational unit and a control unit that executes an overall control of the server 10. The RAM 12 is used as a working memory when the CPU 11 executes various computational processing. The ROM 13 stores various control programs for executing map information update processing or the like, wherein the CPU 11 extracts difference data from the center-side map information database 14, based on a request from the navigation device 2 (to be explained later). The difference data is used for updating map information of a predetermined partitioned region among map information stored in the navigation device 2 to a new version of map information. In addition, the CPU 11 extracts from the updated content database 18 updated content that corresponds to the respective difference data, and distributes such content to the navigation device 2. Note that a microprocessor unit or the like can be used instead of the CPU 11.

Also stored and sectioned by version in the center-side map information database 14 is update map information 17, which is created at the map information distribution center 3 and serves as the underlying map information when updating map information stored in the navigation device 2. Furthermore, update information is also stored for updating a portion (e.g., a region measuring 80 square kilometers centered on a current position of a host vehicle or a preset home point) or all of the current map information stored in the navigation device 2 to the update map information 17. Here, the term "version" refers to creation time information, and is used to identify the time at which map information was created. By referring to the version, it is possible to identify the time at which the map information was created.

The update map information 17 stored in the center-side map information database 14 also holds various types of information that is required to perform route guidance and display maps in the navigation device 2. Such information includes, for example, map display data for displaying maps, intersection data pertaining to each intersection, node data pertaining to each node point, link data pertaining to each road (link), which is one type of facility, search data for searching for a route, point-of-interest (POI) data pertaining to points of interest such as shops and the like, which are one type of facility, and search data for searching for a location.

Here, the map display data in particular is basically partitioned into secondary meshes measuring 10 kilometers by 10 kilometers, and each mesh is then further divided into units that are one-fourth (side length=½), one-sixteenth (side length=¼), and one-sixty-fourth (side length=⅛) the size of the basic mesh. The units are established for individual areas such that the data volume for each unit is roughly the same. The smallest unit is the one-sixty-fourth size, which measures approximately 1.25 kilometers on a side.

The node data include, for example, a branching point on an actual road (including a four-way intersection, T intersection, or the like), node point coordinates (position), which are set at specified intervals according to the radius of curvature and the like of each road, a node attribute, which indicates whether the node corresponds to an intersection or other feature, a connecting link numbers list, which is a list of the link numbers of links that connect to the node, an adjoining node numbers list, which is a list of node numbers of nodes that are joined to the node via links, data pertaining to the height (elevation) of the node point, and the like.

The link data include data on each link that makes up a road. For each road in a link, the data indicates, for example, the road width, slope, cant, bank, road surface conditions, number of lanes, places where the number of lanes decreases, places where the road width decreases, railroad crossings, and the like. For a corner, the data indicates, for example, the radius of curvature, intersection, T-intersecting roads, entrance to and exit from the corner, and the like. For road attributes, the data indicates, for example, a downhill road, an uphill road, or the like. For a road type, the data indicates, for example, an ordinary road, such as a national road, a prefectural road, a narrow street, or the like, or a toll road, such as a national expressway, a metropolitan expressway, an ordinary toll road, a toll bridge, or the like. For toll roads, the data also includes information on access roads (ramps) at expressway entrances and exits, toll collection points (interchanges), and the like.

Update information for each road type are partitioned into units that are one-sixteenth (side length=¼) the size of the secondary meshes measuring 10 kilometers by 10 kilometers, and measure approximately 2.5 kilometers on a side. These are divided into the following categories: a highly restricted road category made up of national expressways, metropolitan expressways, motorways, ordinary toll roads, and one- and two-digit national roads; an ordinary road category made up of national roads with three or more digits, major local roads, prefectural roads, and municipal roads; and a narrow street category made up of narrow streets. The above are respectively stored and controlled by version in the update map information 17.

It should be noted that national expressways, metropolitan expressways, motorways, ordinary toll roads, and one- and two-digit national roads will be hereinafter referred to as highly restricted roads. National roads with three or more digits, major local roads, prefectural roads, and municipal roads will be referred to as ordinary roads. Streets such as those narrower than ordinary roads will be referred to as narrow streets.

The search data is data that is used to search for and display a route to a set destination. The search data includes cost data, which is used to calculate a search cost and is made up of a cost of passing through a node (hereinafter called "a node cost"), a cost of a link that is a component of a road (hereinafter called "a link cost"), and the like. The search data also includes route display data for displaying a route, which is selected by route searching, on the map on a liquid crystal display 25.

The POI data includes data pertaining to points of interest such as hotels, hospitals, gas stations, parking lots, tourist facilities, and the like in each region, stored along with an ID for identifying each point of interest. Note that voice output data is also stored in the center-side map information database 14 for the purpose of outputting specified information through a speaker 26 of the navigation device 2.

At the timing of a request from the navigation device 2, the map information distribution center 3 updates the map information stored in the navigation device 2 using the newest version of the update map information 17 among the update map information 17 stored in the center-side map information database 14. Specifically, in the map information distribution system 1 according to the present example, when there is a request from the navigation device 2 for the distribution of update map information 17 within a predetermined region, difference data is extracted for updating to the newest version of the update map information 17. Updating is then performed by distributing such difference data to the navigation device 2. Here, difference data sent to the navigation device 2 may include sending all information that includes newly constructed road information for identifying newly constructed roads in the newest version of the update map information 17, or may also include sending the minimum information required (only partial update information that includes newly constructed road information for identifying newly constructed roads) for updating the current map information stored in the navigation device 2 to the newest version of the update map information 17.

Meanwhile, the navigation update history database 15 stores information pertaining to a history of updates up to the present time of the map information stored in the navigation device 2, as well as a navigation ID for identifying the navigation device 2. The update history more specifically stores which version of map information is being used within a predetermined section (e.g., within each divided section measuring 2.5 kilometers by 2.5 kilometers) for every link data and node data structuring the map information. The update history is newly overwritten each time the map information of the navigation device 2 is updated.

The updated content database 18 stores coordinate data indicating a coordinate position of an updated road or point of interest in the map information corresponding to the respective difference data that is stored for every version in the update map information 17. The updated content database 18 also stores specific display content (see FIGS. 10 and 11) that communicates updated content pertaining to the updated road or point of interest.

The priority database 19 stores a distance priority table 51 (see FIG. 3), a road rank priority table 52 FIG. 4, an updated content priority table 53 (see FIG. 5), an object notification importance table 54 (see FIG. 6), and so on, to be described later, that are used for determining the priority of updated content pertaining to a road or point of interest in the map information corresponding to the respective difference data stored for every version in the update map information 17.

Note that the map information distribution center 3 may be operated by an individual, business, organization, local government, government-affiliated agency or the like, and may also be operated by a VICS (registered trademark) center.

Communications systems that can be used as the network 4 include, for example, a local area network (LAN), a wide area network (WAN), an intranet, a mobile telephone network, a land-line telephone network, a public communications network, a dedicated communications network, the Internet, and the like. A communications system can also be used that uses communications satellite broadcasting or broadcast satellite broadcasting by a broadcast satellite, digital terrestrial television broadcasting, FM multiplex broadcasting, or the like. A communications system such as a non-stop electronic toll collection (ETC) system, a dedicated short-range communication (DRSC) system, or the like that is used in intelligent transportation systems (ITS) can also be used.

Figure 2:
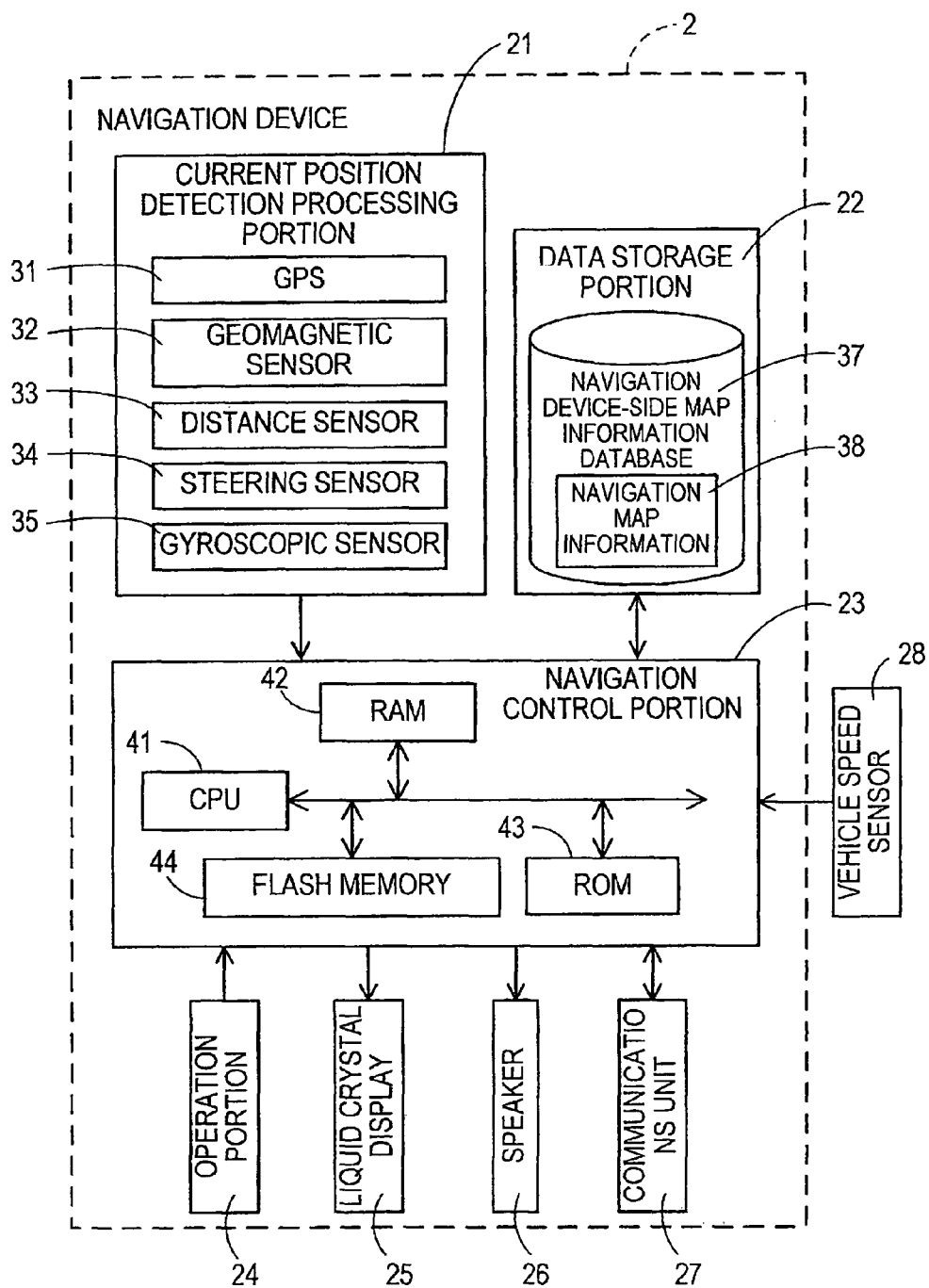
FIG. 2 is a block diagram of an exemplary navigation device of the map information distribution system.

Next, the overall configuration of the navigation device 2, which structures the map information distribution system 1 according to the present example, will be explained using FIG. 2. FIG. 2 is an exemplary block diagram of the navigation device 2.

As shown in FIG. 2, the navigation device 2 according to the present example is made up of a current position detection processing portion 21, a data storage portion 22, a navigation control portion 23, an operation portion 24, the liquid crystal display 25, the speaker 26, and a communications unit 27. The current position detection processing portion 21 detects a current position of a host vehicle. The data storage portion 22 stores a coordinate position of a preset home point (e.g., longitude and latitude) and various types of data. The navigation control portion 23 executes various types of computational processing based on information that is input. The operation portion 24 receives operations from the driver. The liquid crystal display 25 displays information such as maps and the like for the operator, as well as updated content if the map information has been updated. The speaker 26 outputs voice guidance pertaining to route guidance. The communications unit 27 executes communications with an information center such as a road traffic information center and the map information distribution center 3. Also, a vehicle speed sensor 28 that detects a running speed of the host vehicle is connected to the navigation control portion 23.

The current position detection processing portion 21 includes a GPS 31, a geomagnetic sensor 32, a distance sensor 33, a steering sensor 34, a gyroscopic sensor 35 as a direction detection portion, an altimeter (not shown), and the like. The current position detection processing portion 21 is thus capable of detecting the current host vehicle position, a vehicle direction, a distance to a target point (for example, an intersection), and the like.

Specifically, the GPS 31 detects the current host vehicle position on the Earth, as well as the current time, by receiving radio signals transmitted from an artificial satellite. The geomagnetic sensor 32 detects the host vehicle's direction by measuring geomagnetism. The distance sensor 33 detects a distance or the like between specified positions on the road. The distance sensor 33 can be, for example, a sensor that measures a revolution speed of a wheel (not shown) of the host vehicle and then computes a distance based on the measured revolution speed, or the distance sensor 33 can be a sensor that measures acceleration and then computes a distance by integrating the acceleration twice.

The steering sensor 34 detects the steering angle of the host vehicle. The steering sensor 34 can be, for example, an optical rotation sensor or rotation resistance sensor that is attached to a rotating portion of the steering wheel (not shown), an angle sensor that is attached to a wheel, or the like.

The gyroscopic sensor 35 detects the angle of rotation of the host vehicle. The gyroscopic sensor 35 can be, for example, a gas rate gyroscope, a vibration gyroscope, or the like. The direction of the host vehicle can be detected by integrating the rotation angle that is detected by the gyroscopic sensor 35.

The data storage portion 22 includes a hard disk (not shown), which serves as an external storage system and storage medium, a navigation device-side map information database 37, which is stored on the hard disk, and a recording head (not shown), which reads specified programs and the like and writes specified data to the hard disk. Note that in the present embodiment, the hard disk is used as the external storage system and storage medium for the data storage portion 22, but a magnetic disk such as a flexible disk or the like can be used as the external storage system instead of the hard disk. A memory card, a magnetic tape, a magnetic drum, a CD, an MD, a DVD, an optical disk, a magneto-optical disk, a smart card, an optical card, or the like can also be used as the external storage system.

Here, the navigation device-side map information database 37 stores navigation map information 38 that is used for travel guidance and route searching in the navigation device 2 and is subject to updating by the map information distribution center 3. Here, the navigation map information 38 is made up of various types of information that are required to perform route guidance and display maps, similar to the update map information 17. The navigation map information 38 includes, for example, newly constructed road information for identifying newly constructed roads, map display data for displaying maps, intersection data pertaining to each intersection, node data pertaining to each node point, link data pertaining to each road (link), which is one type of facility, search data for searching for a route, point-of-interest (POI) data pertaining to points of interest such as shops and the like, which are one type of facility, and search data for searching for a location. Note that the respective data have already been explained in detail earlier, so such explanations are omitted here.

The content of the navigation device-side map information database 37 is updated by downloading update information such as difference data distributed via the communications unit 27 from the map information distribution center 3.

As shown in FIG. 2, the navigation control portion 23 structuring the navigation device 2 includes internal memory devices such as a controller, such as a CPU 41, a RAM 42, a ROM 43, and a flash memory 44. The CPU 41 serves as a computational unit and a control unit that executes an overall control of the navigation device 2. The RAM 42 is used as a working memory when the CPU 41 executes various computational processing, and stores route data or the like when a route is searched for. The ROM 43 stores control programs, as well as map information update processing programs (see FIG. 7 and the like) to be described later that are executed at engine start-up and at setting of a destination. The flash memory 44 stores programs read out from the ROM 43. Note that semiconductor memory, magnetic core, or the like may be used for the RAM 42, the ROM 43, the flash memory 44, and the like. Also, a microprocessor unit or the like can be used instead of the CPU 41 for the computational unit and the control unit.

In the present example, various types of programs are stored in the ROM 43, and various types of data are stored in the data storage portion 22. However, it is also possible to read the programs, data, and the like from the same external storage system, memory card, or the like and to write the programs, data, and the like to the flash memory 44. It is also possible to update the programs, data, and the like by replacing the memory card or the like.

Also, each of the peripheral devices (actuators), that is, the operation portion 24, the liquid crystal display 25, the speaker 26, and the communications unit 27, are electrically connected to the navigation control portion 23.

The operation portion 24 is made up of a plurality of operation switches (not shown), such as various types of keys, destination setting buttons, and the like, and is operated when the user corrects the current position when starting to drive, when the user inputs a departure point as a guidance starting point or a destination as a guidance ending point, when the user executes a search for information on facilities, and so on. Based on the switch signals that are output by the pressing or the like of each switch, the navigation control portion 23 controls the execution of the corresponding types of operations. Note that a keyboard, a mouse, a bar code reader, a remote control unit for remote operation, a joystick, a light pen, a stylus pen, or the like can be used as the operation portion 24. The operation portion 24 can also be configured as a touch panel on the face of the liquid crystal display 25.

The liquid crystal display 25 displays updated content of map information, operation guidance, an operation menu, key guidance, a guidance route from the current position to a destination, guidance information along the guidance route, traffic information, news, weather forecasts, the time, e-mail, television programs, and the like. Note that a CRT display, a plasma display, or the like can be used instead of the liquid crystal display 25, as can a hologram unit or the like that projects a hologram onto the front windshield of the vehicle.

The speaker 26 outputs the name of the facility that is the selected destination, voice guidance for driving along the guidance route, and the updated content of the map information, based on instructions from the navigation control portion 23. For example, the guidance may be "Turn right 200 meters ahead at XX intersection," "National road route XX has been updated," or the like. Note that in addition to a synthesized voice, the sounds output from the speaker 26 can be various sound effects or various types of guidance information that are pre-recorded on tape, in memory, or the like.

The communications unit 27 is a communications apparatus that executes communications with the map information distribution center 3. As described later, the communications unit 27 executes sending and receiving with the map information distribution center 3 of difference data with respect to the newest version of the update map information 17 within a predetermined region, updated content, and the like. In addition to the map information distribution center 3, the communications unit 27 can also receive, for example, traffic information that is made up of various types of information that are transmitted from a VICS (registered trademark) center or the like, including congestion information, traffic restrictions information, parking lot information, traffic accident information, traffic volume in a service area, and the like.

Next, an example of the distance priority table 51 stored in the priority database 19 of the map information distribution center 3 will be explained based on FIG. 3. FIG. 3 is an example of the distance priority table 51 stored in the priority database 19 of the map information distribution center 3.

Here, the distance priority table 5 is used when determining the priority order of the updated content of difference data, which will be explained later (see step 114 in FIG. 7). The distance priority table 51 stores distance scores corresponding to a distance from a center position of a targeted area whose map information is to be updated to an object such as a road, point of interest, or the like to be updated, the distance serving as factor information making up the updated content.

As shown in FIG. 3, the distance priority table 51 is structured from the following: "Distance From Center Position" indicating a distance from the center position of the targeted area whose map information is to be updated to an object such as a road, point of interest, or the like to be updated, and "Distance Score" indicating a score assigned with respect to the distance from the center position.

For example, if the distance from the center position is less than 10 square kilometers, then a score of "1" is assigned for the distance score.

Next, an example of the road rank priority table 52 stored in the priority database 19 of the map information distribution center 3 will be explained based on FIG. 4. FIG. 4 is an example of the road rank priority table 52 stored in the priority database 19 of the map information distribution center 3.

Here, the road rank priority table 52 is used when determining the priority order of the updated content of difference data, which will be explained later (see step 114 in FIG. 7). The road rank priority table 52 stores road rank scores corresponding to road ranks that indicate the type of road such as a metropolitan expressway, motorway, and the like, which serve as factor information making up the updated content.

As shown in FIG. 4, the road rank priority table 52 is structured from the following; "Road Rank" indicating the type of road such as a metropolitan expressway, motorway, and the like, and "Road Rank Score" indicating a score assigned with respect to the road rank.

For example, if the road rank is a metropolitan expressway/inter-city expressway, then a score of "1" is assigned for the road rank score.

Note that a road rank score is not assigned for municipal roads, narrow streets, and the like that are not included in the road rank of the road rank priority table 52.

Next, an example of the updated content priority table 53 stored in the priority database 19 of the map information distribution center 3 will be explained based on FIG. 5. FIG. 5 is an example of the updated content priority table 53 stored in the priority database 19 of the map information distribution center 3.

Here, the updated content priority table 53 is used when determining the priority order of the updated content of difference data, which will be explained later (see step 114 in FIG. 7). The updated content priority table 53 stores updated content scores corresponding to road updated content (e.g., a newly opened road or the like), which serves as factor information making up the updated content.

As shown in FIG. 5, the updated content priority table 53 is structured from the following: "Road Updated Content" indicating a road newly opened, a toll change, or the like, and "Updated Content Score" indicating a score assigned with respect to the road updated content.

For example, if the road updated content is a newly-opened route/route extension, then a score of "1" is assigned for the updated content score.

Note that an updated content score is not assigned for road width expansions, management changes, or the like not included in the road updated content of the updated content priority table 53.

Figure 6:
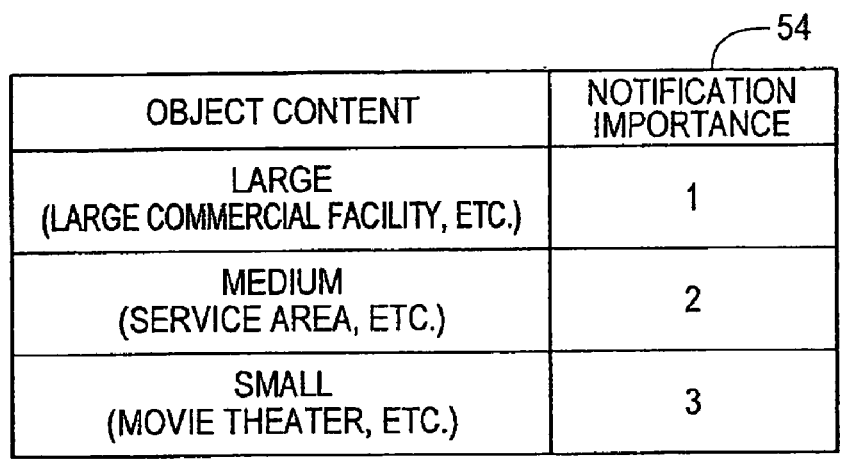
FIG. 6 is an example of an object notification importance table stored in the priority database of the map information distribution center.

Next, an example of the object notification importance table 54 stored in the priority database 19 of the map information distribution center 3 will be explained based on FIG. 6. FIG. 6 is an example of the object notification importance table 54 stored in the priority database 19 of the map information distribution center 3.

Here, the object notification importance table 54 is used when determining the priority order of the updated content of difference data, which will be explained later (see step 114 in FIG. 7). The object notification importance table 54 stores scores indicating the importance of notification that is assigned for objects such as new points of interest or the like, which serve as factor information making up the updated content.

As shown in FIG. 6, the object notification importance table 54 is structured from the following: "Object Content" indicating objects such as new points of interest or the like, and "Notification Importance" wherein scores are stored that indicate the importance of notification that is assigned for the object content.

For example, if the object content is large (a large commercial facility, etc.), then a score of "1" is assigned for the notification importance. If the object content is medium (a service area, parking area, etc.), then a score of "2" is assigned for the notification importance. If the object content is small (a movie theater, gas station, etc.), then a score of "3" is assigned for the notification importance.

Next, based on FIGS. 7 to 18, an exemplary map information update method will be explained. The exemplary method may be implemented, for example, by one or more components of the above-described system. For example, the exemplary method may be implemented by the CPU 41 of the navigation device and the CPU 11 of the map information distribution center 3 executing computer programs stored in the ROM 43 and ROM 13, respectively. However, even though the exemplary structure of the above-described device may be referenced in the description, it should be appreciated that the structure is exemplary and the exemplary method need not be limited by any of the above described exemplary structure.

Figure 7:
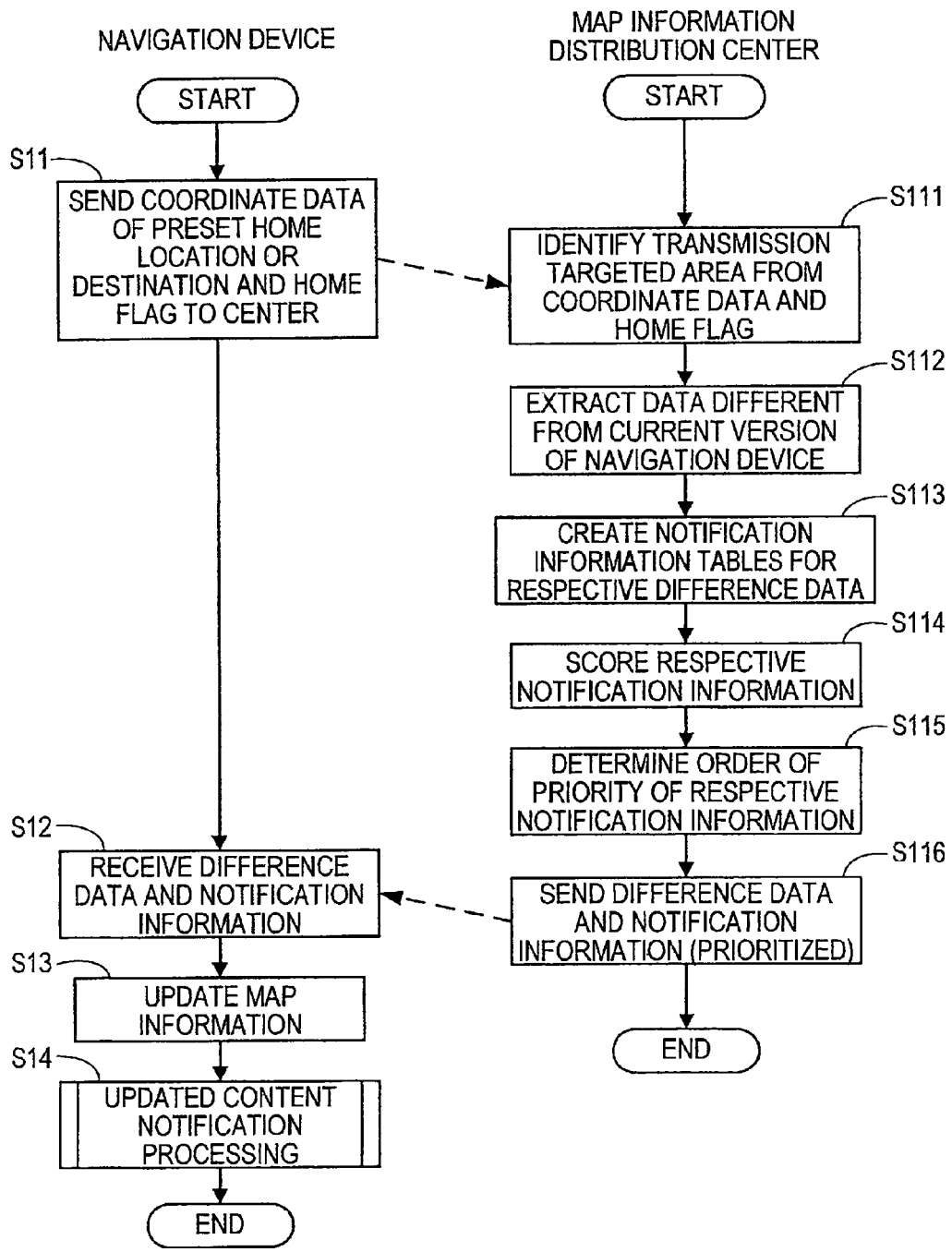
FIG. 7 is an exemplary main flowchart of a map information update method in the map information distribution system.
Figure 8:
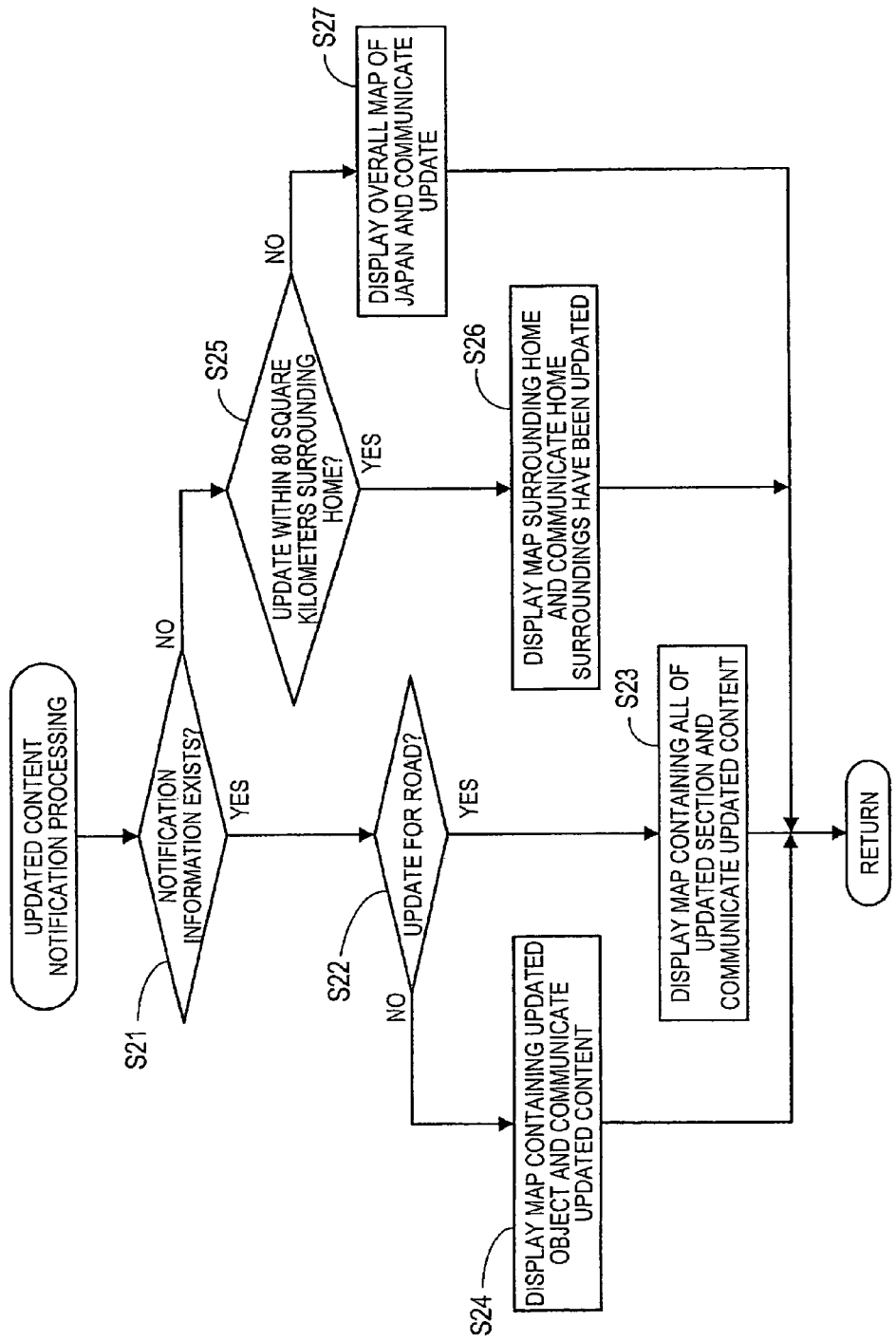
FIG. 8 is a sub method of updated content notification 15 processing in FIG. 7.

FIG. 7 is a main flowchart showing an exemplary map information update method that is executed by the CPU 41 of the navigation device 2 and the CPU 11 of the map information distribution center 3 in the map information distribution system 1 according to the present example, and is executed in order to automatically update navigation map information 38 of a navigation device-side map information database 37 at engine start-up and at setting of a destination, and to subsequently report to a user updated content such as newly constructed roads or the like added by updating the navigation map information 38. FIG. 8 is a sub flowchart showing sub method of updated content notification processing in FIG. 7.

As shown in FIG. 7, first, at step (hereinafter abbreviated to "S") 11, if an ignition switch has been turned ON and the engine is started, i.e., if an accessory (ACC) is turned ON and there is power to the navigation device 2, then the CPU 41 of the navigation device 2 reads out coordinate data for a home point (e.g., the longitude and latitude of the home point, which is hereinafter referred to as a "preset home location") that has been set in advance in the data storage portion 22, since no destination has been set yet. Such coordinate data for the preset home location is stored in the RAM 42 as coordinate data to be sent to the map information distribution center 3. Also, the CPU 41 reads out a home flag from the RAM 42 and sets the home flag to ON, i.e., assigns "1" for the home flag, and again stores the home flag in the RAM 42. Next, the CPU 41 reads out the coordinate data indicating the preset home location and the home flag from the RAM 42, and sends a navigation ID identifying the navigation device 2, in addition to the coordinate data and the home flag, to the map information distribution center 3.

If a destination has been set via the operation portion 24, then at S11, the CPU 41 of the navigation device 2 stores coordinate data for the destination in the RAM 42. Also, the CPU 41 reads out the home flag from the RAM 42 and sets the home flag to OFF, i.e., assigns "0" for the home flag, and again stores the home flag in the RAM 42. Next, the CPU 41 reads out the coordinate data of the destination from the RAM 42, and the home flag from the RAM 42. The CPU 41 then sends a navigation ID identifying the navigation device 2, in addition to the coordinate data and the home flag, to the map information distribution center 3.

Meanwhile, as shown in FIG. 7, if at S111 the CPU 11 of the map information distribution center 3 receives the navigation ID identifying the navigation device 2, as well as the coordinate data and the home flag sent from the navigation device 2 via the center-side communications unit 16, then the CPU 11 stores the navigation ID, the coordinate data, and the home flag in the RAM 12. Next, the CPU 11 reads out the coordinate data and the home flag again from the RAM 12. If the home flag is "1," then a first region centered on the coordinate data (in the present example, a region centered on the coordinate data and measuring approximately 80 square kilometers) is set as a targeted area for which difference data is extracted. In other words, the first region centered on the preset home location is set as the targeted area for which difference data is extracted.

On the other hand, if the CPU 11 reads out the coordinate data and the home flag again from the RAM 12 and the home flag is "0," then a second region centered on the coordinate data (in the present example, a region centered on the coordinate data and measuring approximately 10 square kilometers) is set as the targeted area for which difference data is extracted. In other words, the second region centered on the destination is set as the targeted area for which difference data is extracted.

Next at S112, the CPU 11 reads out the navigation ID received at S111 from the RAM 12. The CPU 11 also reads out information pertaining to the update history of the navigation device 2 regarding the targeted area set at S111 from the navigation update 15 history database 15. Next, the CPU 11 extracts the current versions within each section of the targeted area (e.g., within sections measuring approximately 2.5 kilometers by 2.5 kilometers) in the navigation device 2, which are then stored in the RAM 12. The CPU 11 subsequently extracts difference data, i.e., data that is different between the newest version and the current version in the navigation device 2, which are also then stored in the RAM 12.

Figure 9:
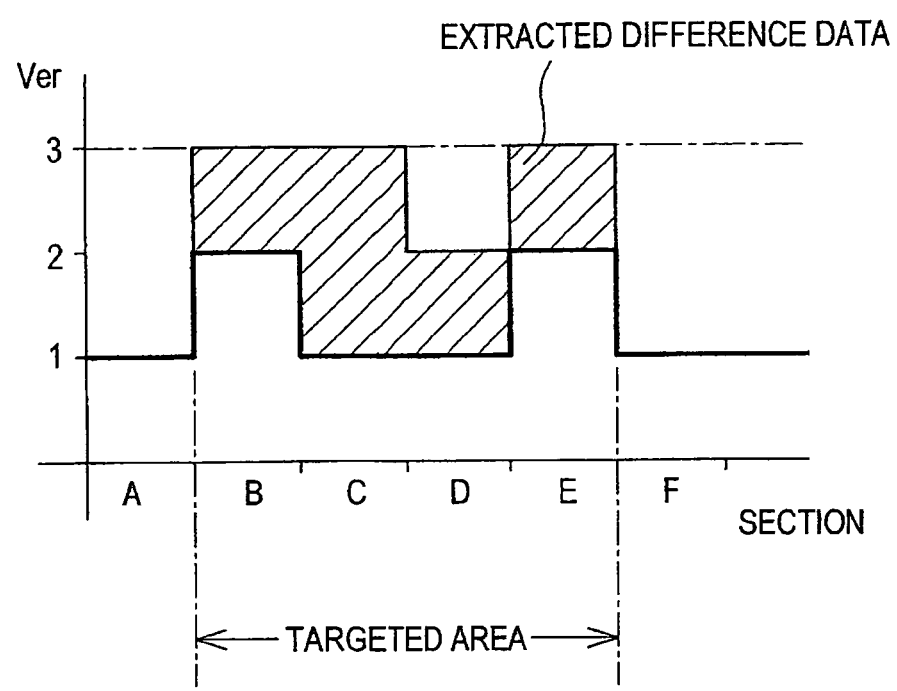
FIG. 9 is an example of difference data extracted from a targeted area by a CPU of the map information distribution center.

Here, an example of extracted difference data will be explained based on FIG. 9. FIG. 9 is an example of difference data extracted from a targeted area by the CPU 11 of the map information distribution center 3.

As shown in FIG. 9, at S111 the CPU 11 sets respective sections B to E of the map information as the targeted area for which difference data is extracted. Next, the CPU 11 reads out the navigation ID from the RAM 12, and reads out information pertaining to the update history of the navigation device 2 from the navigation update history database 15. The current version information for the respective sections B to E is then stored in the RAM 12. Namely, the current version (Ver) of the navigation map information 38 of the navigation device 2 in the targeted area is stored in the RAM 12, wherein the map information for the section B is a version 2, the map information for the respective sections C and D is a version 1, and the map information for the section E is the version 2.

Next, the CPU 11 reads out the map information of the newest version (Ver) for the respective sections B to E from the update map information 17, and extracts the difference data. Namely, for the difference data for the section B, the CPU 11 extracts the difference data of a version 3 and stores the difference data in the RAM 12. For the difference data for the section C, the CPU 11 extracts the difference data of the version 2 and the version 3 and stores the difference data in the RAM 12. For the difference data for the section D, the CPU 11 extracts the difference data of the version 2 and stores the difference data in the RAM 12. For the difference data for the section E, the CPU 11 extracts the difference data of the version 3 and stores the difference data in the RAM 12.

Subsequently at S113, the CPU 11 reads out from the updated content database 18 the coordinate data indicating the coordinate position of a road or point of interest that was updated in the map information corresponding to the respective extracted difference data, as well as specific display content that communicates updated content pertaining to the updated road or point of interest. The CPU 11 then creates a road notification information table 61, which is a list of notification information pertaining to roads, and an object notification information table 62, which is a list of notification information pertaining to objects, and stores the tables in the RAM 12.

Here, the road notification information table 61, which is a list of notification information pertaining to roads, will be explained based on FIG. 10. FIG. 10 is an example of the road notification information table 61, which is a list of notification information pertaining to roads, created at step 113 of FIG. 7.

As shown in FIG. 10, the road notification information table 61 is structured from the following: "Section" indicating the respective sections of the targeted area, "Ver" indicating the version of difference data for the respective sections, "Coordinates" indicating the coordinate position of an endpoint or a midpoint of an updated section of an updated road in map information corresponding to the respective difference data of the respective versions, and "Specific Display Content" indicating notification content pertaining to the updated road.

For example, if the coordinate position of an endpoint or a midpoint of the updated section of the updated road in map information corresponding to the difference data of version 3 of the section B is (X2, Y2), then in the road notification information table 61 "B" is stored in "Section"; "3" is stored in "Ver"; and "(X2, Y2)" is stored in "Coordinates." For "Specific Display Content" in the road notification information table 61, specific display content pertaining to the road and corresponding to the difference data of version 3 of the section B is read out from the updated content database 18 and stored. Namely, "XX motorway: toll between YY and ZZ has been eliminated" is stored.

Figure 11:
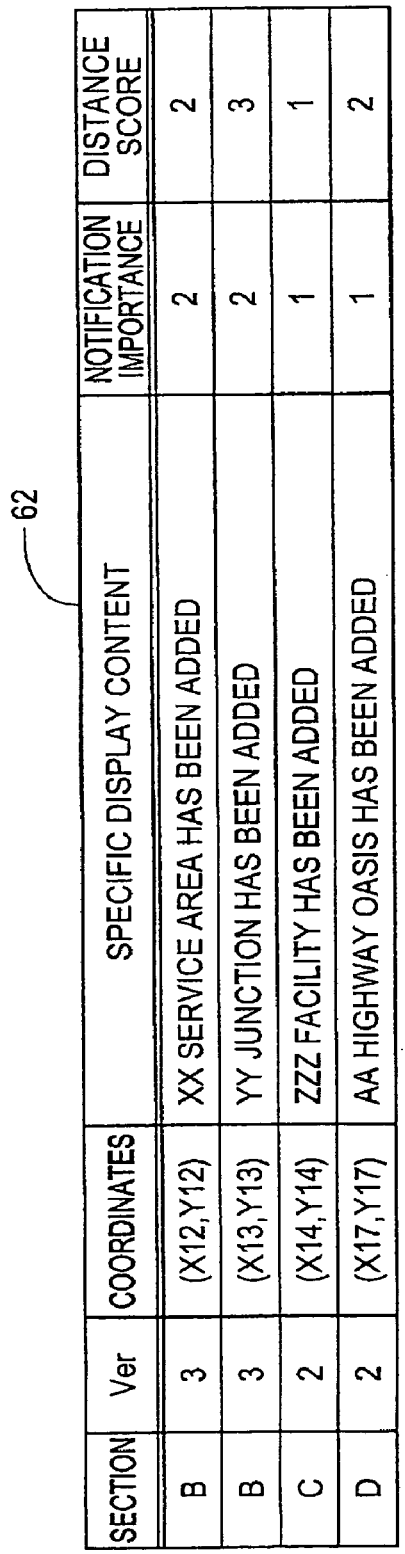
FIG. 11 is an example of an object notification information table created at step 113.

Next, the object notification information table 62, which is a list of notification information pertaining to objects will be explained based on FIG. 11. FIG. 11 is an example of the object notification information table 62, which is a list of notification information pertaining to objects, created at step 113 of FIG. 7.

As shown in FIG. 11, the object notification information table 62 is structured from the following: "Section" indicating the respective sections of the targeted area, "Ver" indicating the version of difference data for the respective sections, "Coordinates" indicating the coordinate position of an updated object in map information corresponding to the respective difference data of the respective versions, and "Specific Display Content" indicating notification content pertaining to the updated object.

For example, if there are two updated objects in map information corresponding to the difference data of version 3 of the section B and the respective coordinate positions are (X12, Y12) and (X13, Y13), then in the object notification information table 62 "B is stored for both in "Section"; "3" is stored for both in "Ver"; and "(X12, Y12)" and "(X13, Y13)" are stored in "Coordinates." For "Specific Display Content"

in the object notification information table 62, specific display content pertaining to the object corresponding to the difference data of version 3 of the section B is read out from the updated content database 18 and stored. Namely, "XX service area has been added" and "YY junction has been added" are stored.

Next at S114, the CPU 11 reads out the road notification information table 61 from the RAM 12. The CPU 11 reads out the road rank score and the updated content score in the respective notification information based on the respective specific display content, which communicates the updated content pertaining to roads, from the road rank priority table 52 and the updated content priority table 53 stored in the priority database 19, and stores these in the road notification information table 61. In addition, the CPU 11 reads out the coordinate data stored in the RAM 12 at S111, and calculates the distance from the coordinate data, i.e., the center position of the targeted area, to the coordinates in the respective notification information. The CPU 11 then reads out the distance score corresponding to the distance from the distance priority table 51 stored in the priority database 19, and stores this in the road notification information table 61.

For example, as shown in FIG. 10, if the specific display content corresponding to the difference data of version 3 of the section B in the road notification information table 61 is the notification information of "XX motorway," then a score of "1" is read out as the road rank score from the road rank priority table 52, and stored in the road notification information table 61. Also, if the specific display content corresponding to the difference data of version 3 of the section B in the road notification information table 61 is the notification information "toll between YY and ZZ has been eliminated," then a score of "2" is read out as the updated content score from the updated content priority table 53, and stored in the road notification information table 61. Furthermore, if the coordinates corresponding to the difference data of version 3 of the section B in the road notification information table 61 is the notification information of "(X2, Y2)," then the coordinate data stored in the RAM 12 at S111 is read out, and the distance from the coordinate data to (X2, Y2) is calculated. If the distance is less than 10 square kilometers from the center position of the targeted area, then a score of "1" is read out as the distance score from the distance priority table 51, and stored in the road notification information table 61.

Note that there may be cases where the respective notification information, road rank score and updated content score, which are based on the respective specific display content that communicates updated content pertaining to roads in the road notification information table 61, cannot be read out from the road rank priority table 52 and the updated content priority table 53 stored in the priority database 19. In such cases, the CPU 11 judges the priority of the notification information as low and deletes such notification information from the road notification information table 61. Therefore, updated content pertaining to municipal roads and narrow streets, as well as notification information pertaining to road width expansions, management changes, or the like are deleted from the road notification information table 61.

Also at S114, the CPU 11 reads out the object notification information table 62 from the RAM 12. The CPU 11 reads out the notification importance in the respective notification information based on the respective specific display content, which communicates the updated content pertaining to objects, from the object notification importance table 54 stored in the priority database 19, and stores these in the object notification information table 62. In addition, the CPU 11 reads out the coordinate data stored in the RAM 12 at S111, and calculates the distance from the coordinate data, i.e., the center position of the targeted area, to the coordinates in the respective notification information. The CPU 11 then reads out the distance score corresponding to the distance from the distance priority table 51 stored in the priority database 19, and stores this in the object notification information table 62.

For example, as shown in FIG. 11, if the specific display content corresponding to the difference data of version 3 of the section B in the object notification information table 62 is the notification information of "XX service area," then a score of "2" is read out as the notification importance from the object notification importance table 54, and stored in the object notification information table 62. Furthermore, if the coordinates corresponding to the difference data of version 3 of the section B in the object notification information table 62 is the notification information of "(X12, Y12)," then the coordinate data stored in the RAM 12 at S111 is read out, and the distance from the coordinate data to (X12, Y12) is calculated. If the distance is 10 square kilometers to less than 60 square kilometers from the center position of the targeted area, then a score of "2" is read out as the distance score from the distance priority table 51, and stored in the object notification information table 62.

There may be cases where the respective notification information of notification importance, which are based on the respective specific display content that communicates updated content pertaining to objects in the object notification information table 62, cannot be read out from the object notification importance table 54 stored in the priority database 19. In such cases, the CPU 11 judges the priority of the notification information as low and deletes such notification information from the object notification information table 62. Therefore, notification information that pertains to updated content pertaining to small restaurants, diners, or the like are deleted from the object notification information table 62.

Thereafter at S115, the CPU 11 determines the priority order of the respective notification information pertaining to updated roads and points of interest in the map information corresponding to the respective extracted difference data, based on the road notification information table 61 and the object notification information table 62. The CPU 11 then creates a prioritized notification information table 63 as exemplified in FIG. 14, and stores this in the RAM 12. Note that in the present example, the priority order of notification information pertaining to roads is set higher than the priority order of notification information pertaining to objects (points of interest) (see FIG. 14).

Based on FIGS. 12 and 14, a method for determining the priority order of the respective notification information pertaining to roads stored in the road notification information table 61 will be explained. The exemplary method may be implemented, for example, by one or more components of the above-described system. For example, the exemplary method may be implemented by the CPU 41 of the navigation device and the CPU 11 of the map information distribution center 3 executing computer programs stored in the ROM 43 and ROM 13, respectively. However, even though the exemplary structure of the above-described device may be referenced in the description, it should be appreciated that the structure is exemplary and the exemplary method need not be limited by any of the above described exemplary structure.

Figure 12:
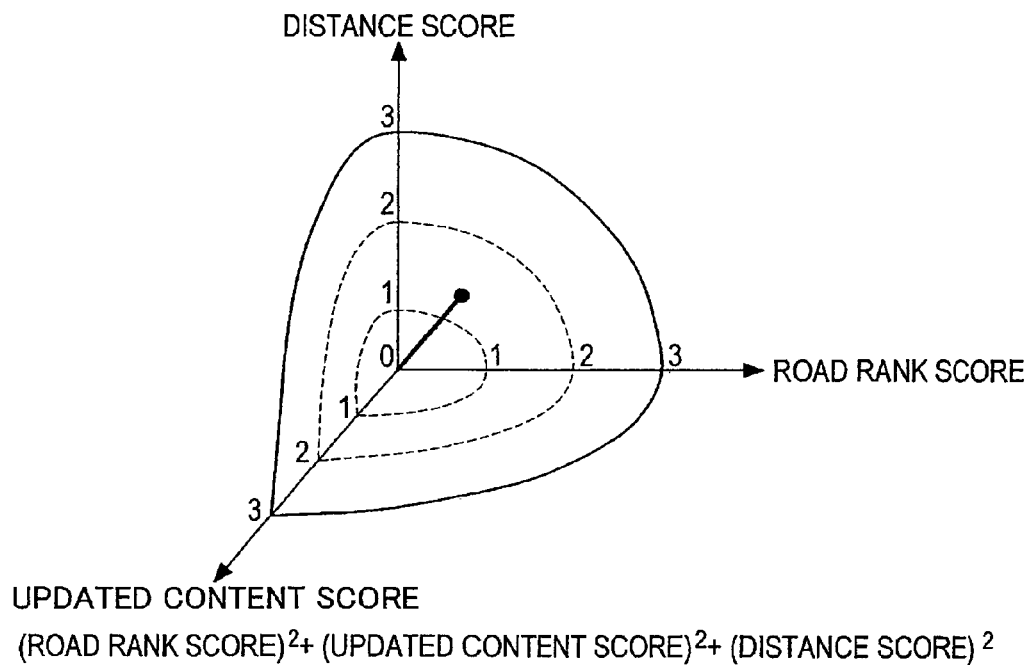
FIG. 12 is an exemplary method for calculating a total score number of respective notification information related to roads.

As shown in FIG. 12, first, the CPU 11 reads out the respective score numbers for the road rank scores, the updated content scores, and the distance scores of the respective notification information pertaining to roads, which are stored in the road notification information table 61. The respective score numbers are squared and added together to calculate total score numbers, which are stored in the RAM 12.

The CPU 11 then extracts notification information whose specific display content relates to the new construction or extension of roads from the road notification information table 61, and sorts the total score numbers in a descending order of priority so that the notification information with the smallest total score number comes first. Thereafter, in the prioritized notification information table 63 stored in the RAM 12, "Road" is stored in "Category"; the sorted order is stored in "Order of Priority"; and the specific display content of the respective notification information is stored in the sorted order.

Next, the CPU 11 extracts notification information whose specific display content relates to tolls from the road notification information table 61, and sorts the total score numbers in a descending order of priority so that the notification information with the smallest total score number comes first. Thereafter, in the prioritized notification information table 63 stored in the RAM 12, "Toll" is stored in "Category" after the "Road" notification information; the sorted order, which continues the order of the "Road" notification information, is stored in "Order of Priority"; and the specific display content of the respective notification information is stored in the sorted order.

For example, as shown in FIG. 14, the specific display content whose order of priority is "1" and whose category is "Road" in the prioritized notification information table 63 stores the specific display content of "AA expressway: CC interchange to BB interchange has been updated," which corresponds to the difference data of version 3 of the section E and whose total score number is a score of "6" in the road notification information table 61 shown in FIG. 10. Also, the specific display content whose order of priority is "3" and whose category is "Toll" in the prioritized notification information table 63 stores the specific display content of "XX motorway: toll between YY and ZZ has been eliminated," which corresponds to the difference data of version 3 of the section B and whose total score number is a score of "6" in the road notification information table 61.

Next, based on FIGS. 13 and 14, a method for determining the priority order of the respective notification information pertaining to objects stored in the object notification information table 62 will be explained. The exemplary method may be implemented, for example, by one or more components of the above-described system. For example, the exemplary method may be implemented by the CPU 41 of the navigation device and the CPU 11 of the map information distribution center 3 executing computer programs stored in the ROM 43 and ROM 13, respectively. However, even though the exemplary structure of the above-described device may be referenced in the description, it should be appreciated that the structure is exemplary and the exemplary method need not be limited by any of the above described exemplary structure.

Figure 13:
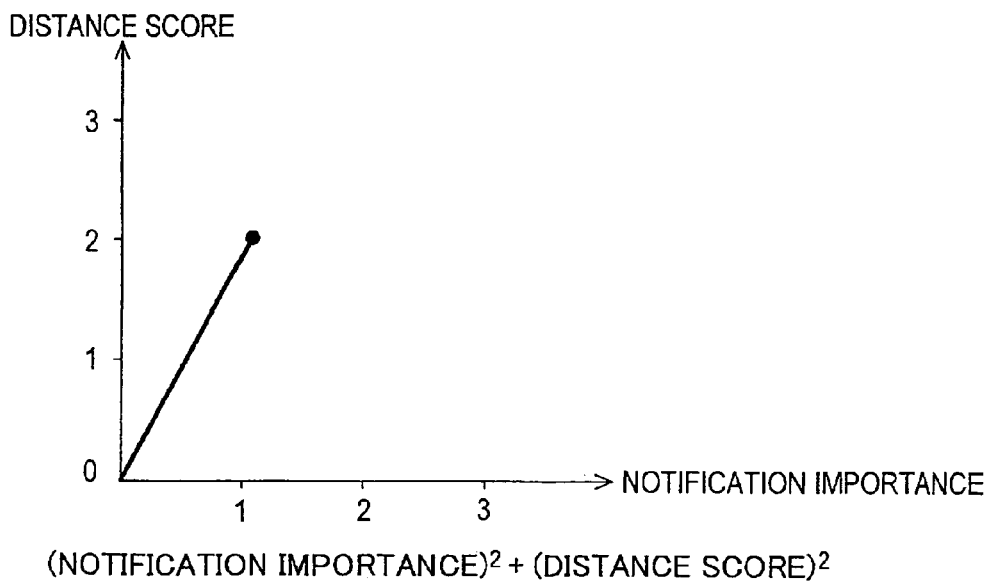
FIG. 13 is an exemplary method for calculating a total score number of respective notification information related to objects.

As shown in FIG. 13, first, the CPU 11 reads out the respective score numbers for the notification importance and the distance scores of the respective notification information pertaining to objects, which are stored in the object notification information table 62. The respective score numbers are squared and added together to calculate total score numbers, which are stored in the RAM 12.

The CPU 11 then sorts the total score numbers of the respective notification information of the object notification information table 62 in a descending order of priority so that the notification information with the smallest total score number comes first. Thereafter, in the prioritized notification information table 63, "Object" is stored in "Category" after the "Toll" notification information; the sorted order, which continues the order of the "Toll" notification information, is stored in "Order of Priority"; and the specific display content of the respective notification information is stored in the sorted order.

For example, as shown in FIG. 14, the specific display content whose order of priority is "6" and whose category is "Object" in the prioritized notification information table 63 stores the specific display content of "ZZZ facility has been added," which corresponds to the difference data of version 2 of the section C and whose total score number is a score of "2" in the object notification information table 62 shown in FIG. 11.

Next at S116, the CPU 11 reads out the navigation ID stored in the RAM 12 at S111. From the RAM 12, the CPU 11 reads out the difference data for the targeted area stored in the RAM 12 at S113 and the prioritized notification information table 63 created at S115, and sends these to the navigation device 2 that corresponds to the navigation ID. Note that if the prioritized notification information table 63 is not created at S115, then the CPU 11 reads out from the RAM 12 only the difference data for the targeted area stored in the RAM 12 at S113, and sends the difference data to the navigation device 2.

In addition, the CPU 11 changes the current versions of the respective sections in the targeted area of the navigation device 2 that are stored in the navigation update history database 15 to the newest versions, and subsequently ends the processing.

Meanwhile, as shown in FIG. 7, at S12 the CPU 41 of the navigation device 2 may receive the difference data for the targeted area (which measures 80 square kilometers centered on the preset home location or 10 square kilometers centered on the destination) and the prioritized notification information table 63 from the map information distribution center 3 via the communications unit 27. In such case, the CPU 41 stores the difference data and the prioritized notification information table 63 in the RAM 42.

Subsequently at S13, the CPU 41 reads out the received difference data from the RAM 12 and updates the map information for the targeted area of the navigation map information 38 to the newest version of map information.

Then at S14, the CPU 41 executes sub processing (see FIG. 8) for updated content notification processing that will be described later, and ends the processing.

Next, based on FIG. 8, sub processing for updated content notification processing will be explained. The exemplary method may be implemented, for example, by one or more components of the above-described system. For example, the exemplary method may be implemented by the CPU 41 of the navigation device and the CPU 11 of the map information distribution center 3 executing computer programs stored in the ROM 43 and ROM 13, respectively. However, even though the exemplary structure of the above-described device may be referenced in the description, it should be appreciated that the structure is exemplary and the exemplary method need not be limited by any of the above described exemplary structure.

As shown in FIG. 8, at S21 the CPU 41 executes determination processing that determines whether the prioritized notification information table 63 was received and stored in the RAM 42 at S12. If the prioritized notification information table 63 is stored in the RAM 42 (YES at S21), then the CPU 41 proceeds to the processing at S22. At S22, the CPU 41 reads out the received prioritized notification information table 63 from the RAM 42. Then, the CPU 41 executes determination processing that determines whether "Road" or "Toll" is stored in "Category" of the prioritized notification information table 63, i.e., determines whether update information with a high utility value pertaining to roads is included in the received difference data.

If "Road" or "Toll" is stored in "Category" of the prioritized notification information table 63, i.e., if there is updated content pertaining to roads (YES at S22), then the CPU 41 proceeds to the processing at S23. At S23, the CPU 41 reads out the specific display content whose order of priority is first in the prioritized notification information table 63, and displays a map that contains all of the updated section of the navigation map information 38 (e.g., a map whose range includes the updated section with roads that have been newly opened or whose tolls have been eliminated) which is applicable to the specific display content on the liquid crystal display 25. In addition to displaying the specific display content on the liquid crystal display 25, the CPU 41 communicates updated content with a high utility value to the user. The CPU 41 subsequently ends the sub processing and returns to the main flowchart.

Figure 15:
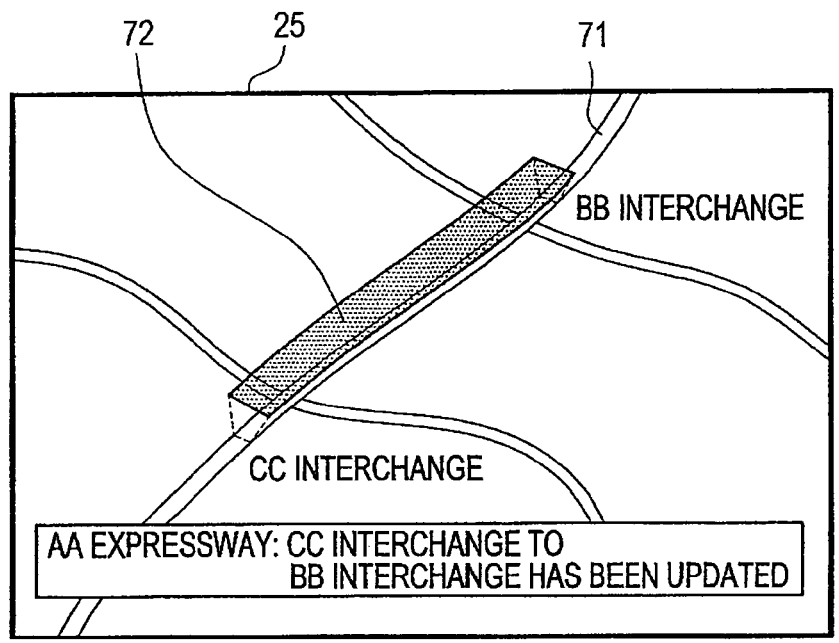
FIG. 15 is an example of the display of a liquid crystal display that communicates updated content of a first priority among update information related to roads.

For example, as shown in FIG. 15, if the specific display content whose order of priority is "1" and whose category is "Road" in the prioritized notification information table 63 is "AA expressway: CC interchange to BB interchange has been updated," then the CPU 41 reads out the updated map information for "AA expressway: CC interchange to BB interchange has been updated" from the navigation map information 38. The CPU 41 then displays a map that contains all of a road 72 between the CC interchange and BB interchange of an AA expressway 71 on the liquid crystal display 25. The road 72 between CC interchange and BB interchange is also displayed as raised to be distinguishable from other portions. At the same time, the CPU 41 displays the specific display content "AA expressway: CC interchange to BB interchange has been updated" at the lower end of the liquid crystal display 25 to report the specific updated content. Note that the specific display content "AA expressway: CC interchange to BB interchange has been updated" may be orally reported via the speaker 26. Also, the color, brightness, or the like of the road 72 between CC interchange and BB interchange may be changed so as to be displayed in a distinguishable manner.

Thus, the user can find out that the AA expressway between CC interchange and BB interchange, which is within a region measuring 80 square kilometers centered on the preset home location or within a region measuring 10 square kilometers centered on the destination, has been newly opened.

Meanwhile, if "Road" or "Toll" is not stored in "Category" of the prioritized notification information table 63 at S22, i.e., if only "Object" is stored in "Category" (NO at S22), then the CPU 41 proceeds to the processing at S24. At S24, the CPU 41 reads out the specific display content whose order of priority is first in the prioritized notification information table 63, and displays a map that contains all of the object applicable to the specific display content (e.g., a map whose range includes objects such as newly opened service areas (SA) and large commercial facilities) on the liquid crystal display 25. In addition to displaying the specific display content on the liquid crystal display 25, the CPU 41 communicates updated content with a high utility value to the user. The CPU 41 subsequently ends the sub processing and returns to the main flowchart.

Figure 16:
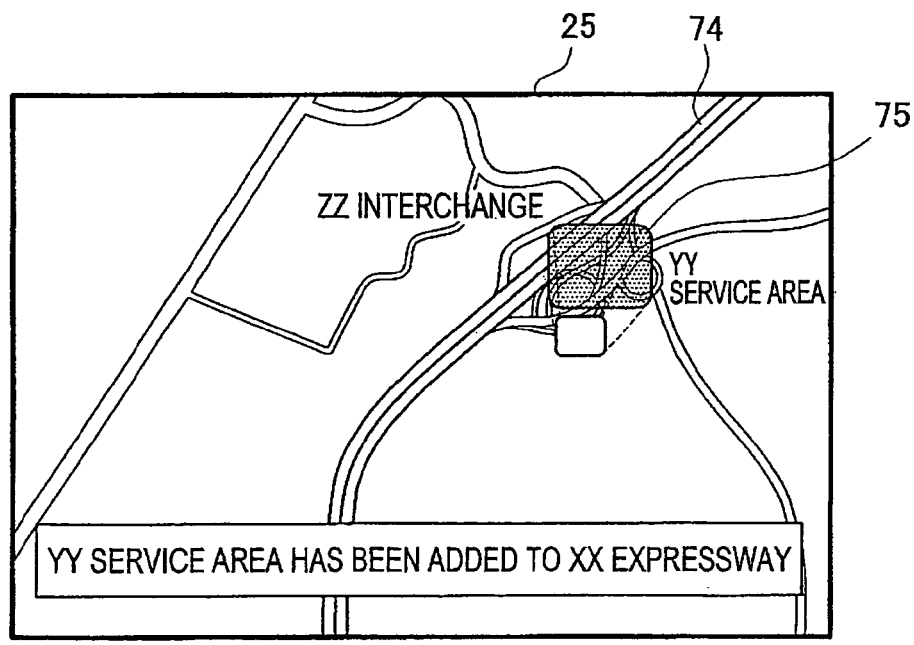
FIG. 16 is an example of the display of the liquid crystal display that communicates updated content of a first priority among update information related to objects.

For example, as shown in FIG. 16, if the specific display content whose order of priority is "1" and whose category is "Object" in the prioritized notification information table 63 is "W service area has been added to XX expressway," then the CPU 41 displays a map that contains all of a YY service area (SA) 75 newly opened on an XX expressway 74 on the liquid crystal display 25. The W service area 75 is also displayed as raised to be distinguishable from other portions. At the same time, the CPU 41 displays the specific display content "W service area has been added to XX expressway" at the lower end of the liquid crystal display 25 to report the specific updated content. Note that the specific display content "YY service area has been added to XX expressway" may be orally reported via the speaker 26. Also, the color, brightness, or the like of the YY service area 75 may be changed so as to be displayed in a distinguishable manner.

Thus, the user can find out that the W service area on the XX expressway, which is within a region measuring 80 square kilometers centered on the preset home location or within a region measuring 10 square kilometers centered on the destination, has been newly opened.

On the other hand, if the prioritized notification information table 63 is not stored in the RAM 42 at S21, i.e., if only difference data is received from the map information distribution center 3 (NO at S21), then the CPU 41 proceeds to the processing at S25. At S25, the CPU 41 reads out the coordinate data of the preset home location (e.g., longitude and latitude) serving as an update point from the data storage portion 22. The CPU 41 then executes determination processing that determines whether the section in the received difference data is update information for updating a section within 80 square kilometers centered on the preset home location.

If the received difference data is update information that updates a section within 80 square kilometers centered on the preset home location (YES at S25), then the CPU 41 proceeds to the processing at S26. At S26, the CPU 41 reads out the coordinate data of the preset home location again and displays a map surrounding the preset home location (e.g., a map measuring 2.5 square kilometers centered on the preset home location) that serves as a map surrounding the update point on the liquid crystal display 25. After displaying a notification indicating that the map information surrounding the preset home location has been updated on the liquid crystal display 25, the CPU 41 subsequently ends the sub processing and returns to the main flowchart.

Figure 17:
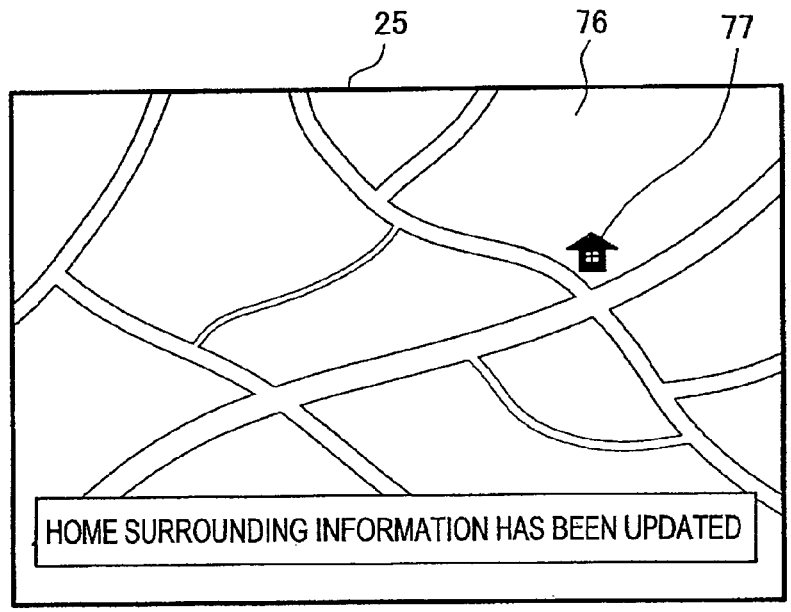
FIG. 17 is an example of the display of the liquid crystal display that communicates updating of map information when only difference data is received within 80 square kilometers centered on a preset home location.

For example, as shown in FIG. 17, if the received difference data is update information that updates a section within 80 square kilometers centered on the preset home location (YES at S25), then the CPU 41 displays a map 76 measuring 2.5 square kilometers that is centered on the preset home location on the liquid crystal display 25, and displays a home mark 77 that indicates the preset home location on the liquid crystal display 25. At the same time, the CPU 41 displays "Home surrounding information has been updated" at the lower end of the liquid crystal display 25 to report that the map information for a section within 80 square kilometers centered on the preset home location has been updated. Note that "Home surrounding information has been updated" may be orally reported via the speaker 26.

Thus, the user can find out that map information pertaining to municipal roads, narrow streets, and the like surrounding the preset home location has been updated.

On the other hand, if the received difference data is update information that updates a section outward 80 square kilometers centered on the preset home location, i.e., if the received difference data is update information that updates a section within 10 square kilometers centered on a destination and more than 80 kilometers away from the preset home location (NO at S25), then the CPU 41 proceeds to the processing at S27. At S27, the CPU 41 displays an overall map of Japan serving as a map whose range is based on units of administrative areas on the liquid crystal display 25. After displaying a notification indicating that the navigation map information 38 has been updated on the liquid crystal display 25, the CPU 41 subsequently ends the sub processing and returns to the main flowchart.

Figure 18:
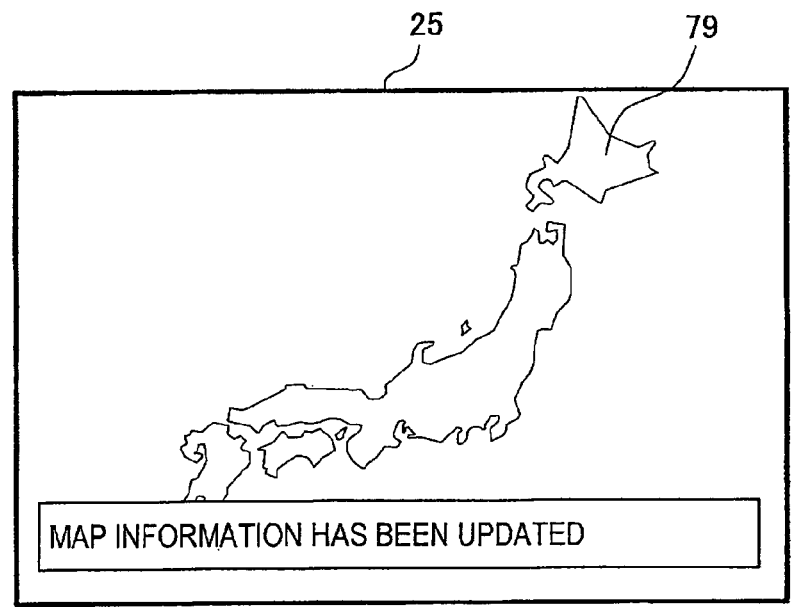
FIG. 18 is an example of the display of the liquid crystal display that communicates updating of map information when only difference data is received outside of 80 square kilometers centered on the preset home location.

For example, as shown in FIG. 18, if the received difference data is update information that updates a section within 10 square kilometers centered on a destination and more than 80 kilometers away from the preset home location (NO at S25), the CPU 41 displays an overall map 79 of Japan on the liquid crystal display 25. At the same time, the CPU 41 displays "Map information has been updated" at the lower end of the liquid crystal display 25 to report that the map information for a section outward 80 square kilometers centered on the preset home location has been updated. Note that "Map information has been updated" may be orally reported via the speaker 26.

Thus, the user can find out that map information stored in the navigation map information 38 has been updated.

Note that an "administrative area" denotes, for example, Japan, Tokyo metropolis, a prefecture, city, or the like in Japan, and denotes a country, commonwealth, state, or the like outside of Japan. Furthermore, the map whose range is based on administrative areas is not particularly limited to a map of Japan that represents the country of Japan, and instead, maps such as the following may be displayed: a map of the Tokyo metropolis, a prefecture, government-designated city, or the like, a map of the six Tohoku prefectures representing the Tohoku region, a map of the three Tokai prefectures made up of Aichi, Mie, and Gifu, a map of Shikoku made up of the four prefectures of Kagawa, Ehime, Kochi, and Tokushima, and a map of the seven prefectures of Kyushu. In the case of maps outside of Japan, the maps are not particularly limited to maps of foreign countries such as the United States, and instead, maps of states such as Hawaii or New York may be displayed. Moreover, the maps are not particularly limited to a map of one country, and a plurality of countries such as the three Baltic states may be displayed.

As explained in detail above, in the map information distribution system 1 according to the present example, the CPU 11 of the map information distribution center 3 may receive a navigation ID identifying the navigation device 2, as well as the coordinate data and the home flag. If the home flag is ON, then the CPU 11 extracts the difference data for a first region centered on the coordinate data of the preset home location; and if the home flag is OFF, then the CPU 11 extracts the difference data for a second region centered on the coordinate data of the destination (S111 to S112). In addition, the CPU 11 extracts notification information that communicates respective updated content pertaining to roads and objects for each section of difference data in the first region or the second region from the updated content database 18, in order to create the road notification information table 61 and the object notification information table 62 (S113). Then, the CPU 11 scores the respective notification information pertaining to the roads in the road notification information table 61 and the respective notification information pertaining to objects in the object notification information table 62, based on the distance priority table 51, the road rank priority table 52, the updated content priority table 53, and the notification importance table 54 stored in the priority database 19 (S114). The CPU 11 squares and adds together the respective score numbers assigned to the respective notification information pertaining to roads in the road notification information table 61 and the respective notification information pertaining to objects in the object notification information table 62. Accordingly, total score numbers are calculated so as to determine the order of priority of the respective notification information pertaining to roads and points of interest and create the prioritized notification information table 63 (S115). Next, the CPU 11 sends the extracted difference data for the first region or the second region, as well as the prioritized notification information table 63, to the navigation device 2 identified by the navigation ID (S116).

Thus, regarding the respective specific display content of the prioritized notification information table 63 sent to the navigation device 2 from the map information distribution center 3, specific display content pertaining to the road rank, road changed content, and object content is selected based on the distance priority table 51, the road rank priority table 52, the updated content priority table 53, and the notification importance table 54. The respective score numbers assigned to the selected specific display content are squared and added together to calculate total score numbers. Based on the total score numbers, the order of priority of the respective specific display content is then determined. Therefore, it is possible to select specific display content of updated content that has a high user utility value, and send the specific display content to the navigation device 2 from the map information distribution center 3. Furthermore, the CPU 41 of the navigation device 2 reports the specific display content whose order of priority is first among the respective specific display content of the prioritized notification information table 63, thereby enabling the effective communication of updated content with the highest user utility value.

Regarding the respective specific display content pertaining to roads in the prioritized notification information table 63, the respective score numbers pertaining to the distance from the center position of the targeted area, road rank, and road updated content, which are based on the distance priority table 51, the road rank priority table 52, and the updated content priority table 53, are squared and added together to calculate total score numbers. Based on the total score numbers, the order of priority of the respective specific display content pertaining to roads is then determined. Therefore, based on the respective specific display content in the prioritized notification information table 63, the navigation device 2 can give priority to informing the user of newly opened sections or the like pertaining to the highly restricted road category made up of national expressways, metropolitan expressways, motorways, ordinary toll roads, and one- and two-digit national roads that are near the center of the targeted area. Updated content with a high user utility value that considers the region where the user lives can thus be selected and effectively communicated.

Regarding the respective specific display content pertaining to objects in the prioritized notification information table 63, the respective score numbers pertaining to the distance from the center position of the targeted area and the notification importance, which are based on the distance priority table 51 and the notification importance table 54, are squared and added together to calculate total score numbers. Based on the total score numbers, the order of priority of the respective specific display content pertaining to objects is then determined. Therefore, based on the respective specific display content in the prioritized notification information table 63, the navigation device 2 can give priority to informing the user of objects with a high notification importance, such as newly opened large commercial facilities or the like, that are near the center of the targeted area. Updated content with a high user utility value that considers the region where the user lives can thus be selected and effectively communicated.

In addition, if the ignition switch has been turned ON and the engine has started, then the CPU 41 of the navigation device 2 sends the navigation ID identifying the navigation device 2, in addition to the coordinate data for the preset home location and the home flag set to ON, to the map information distribution center 3 (S11). Therefore, when the engine has been started, the CPU 41 of the navigation device 2 can give priority to informing the user of newly opened sections or the like pertaining to the highly restricted road category made up of national expressways, metropolitan expressways, motorways, ordinary toll roads, and one- and two-digit national roads, as well as objects with a high notification importance such as newly opened large commercial facilities or the like, near the preset home location. Updated content with a high user utility value that considers the region where the user lives can thus be selected and effectively communicated.

Furthermore, if a destination has been set, then the CPU 41 of the navigation device 2 sends the navigation ID identifying the navigation device 2, in addition to the coordinate data for the destination and the home flag set to OFF, to the map information distribution center 3 (S11). Therefore, when a destination has been set, the CPU 41 of the navigation device 2 can give priority to informing the user of newly opened sections or the like pertaining to the highly restricted road category made up of national expressways, metropolitan expressways, motorways, ordinary toll roads, and one- and two-digit national roads, as well as objects with a high notification importance such as newly opened large commercial facilities or the like, near the destination. Updated content with a high user utility value that considers the user's use situation can thus be selected and effectively communicated.

In the map information distribution system 1 according to the present embodiment, if "Road" or "Toll" is stored in "Category" of the prioritized notification information table 63 received along with the difference data, then the CPU 41 of the navigation device 2 displays on the liquid crystal display 25 a map that contains all of the updated section of the navigation map information 38 which is applicable to the specific display content whose order of priority is first. On the other hand, if only "Object" is stored in "Category" of the prioritized notification information table 63 received along with the difference data, then the CPU 41 displays on the liquid crystal display 25 a map that contains all of the object applicable to the specific display content whose order of priority is first. The CPU 41 displays the specific display content whose order of priority is first on the liquid crystal display 25 to notify the user of updated content with a high utility value (from YES at S21 to S24). Meanwhile, if the CPU 41 receives only the difference data for the update information that updates a section within 80 square kilometers centered on the preset home location and does not receive the prioritized notification information table 63, then the CPU 41 displays a map surrounding the present home location on the liquid crystal display 25 and also displays a notification indicating that the map information surrounding the preset home location has been updated on the liquid crystal display 25. On the other hand, if the CPU 41 receives only the difference data for the update information that updates a section within 10 square kilometers centered on a destination and more than 80 kilometers away from the preset home location, and does not receive the prioritized notification information table 63, then the CPU 41 displays an overall map of Japan on the liquid crystal display 25 and also displays a notification indicating that the navigation map information 38 has been updated on the liquid crystal display 25 (from NO at S21 to S27).

Thus, if the CPU 41 of the navigation device 2 receives the prioritized notification information table 63, i.e., if the CPU 41 receives notification information such as a newly constructed road or road extension pertaining to roads whose rank is at least a metropolitan expressway, inter-city expressway, toll road, one-, two-, or three-digit national road, or prefectural road or receives notification information pertaining to objects whose notification importance is assigned a score of "1" to "3" such as a large commercial facility, service area, or movie theater, then the CPU 41 performs the following. Namely, the CPU 41 displays a map that contains all of the road updated section or all of the object on the liquid crystal display 25, displays the specific display content on the liquid crystal display 25, and reports in detail the updated portion pertaining to the road or object. Accordingly, it is possible to report to the user in detail with regard to the updated portion of the road or object with a high utility value. Furthermore, the user can easily confirm the updated section pertaining to roads such as a newly constructed road, as well as the updated content pertaining to objects such as a newly open service area.

In addition, the CPU 41 may receive only the difference data for the update information that updates a section within 80 square kilometers centered on the preset home location, i.e., the CPU 41 may receive the update information for a road width expansion, local road, or the like within 80 square kilometers centered on the home location. In such case, the CPU 41 displays a map surrounding the preset home location on the liquid crystal display 25, and displays a notification indicating that the map information surrounding the preset home location has been updated. Therefore, it is possible to change the reporting method depending on the updated content of the map information. In addition, a map surrounding the preset home location is displayed on the liquid crystal display 25 for the user, whereby the user can easily become aware of an update to map information for a road width expansion, local road, or the like within 80 square kilometers centered on the home location.

Also, the CPU 41 may receive only the difference data for the update information that updates a section within 10 square kilometers centered on a destination more than 80 kilometers away from the preset home location, i.e., the CPU 41 may receive the update information for a road width expansion, local road, or the like within 10 square kilometers centered on a destination more than 80 kilometers away from the preset home location. In such case, the CPU 41 displays an overall map of Japan on the liquid crystal display 25, and displays a notification indicating that the navigation map information 38 has been updated on the liquid crystal display 25. Therefore, it is possible to change the reporting method depending on the updated content of the map information. In addition, an overall map of Japan is displayed on the liquid crystal display 25 for the user, whereby the user can easily become aware of an update to map information for a road width expansion, local road, or the like within 10 square kilometers centered on a destination that is more than 80 kilometers away from the home location.

It should be noted that the present invention is not particularly limited to the above example, and various improvements and modifications exist that remain within the scope of the present invention.

For example, at step 116, the CPU 11 of the map information distribution center 3 may send only specific display content whose order of priority is first in the prioritized notification information table 63, in addition to the difference data. Thus, the navigation device 2 can inform the user of updated content with the highest utility value among the received difference data. This also reduces the data volume communicated between the map information distribution center 3 and the navigation device 2, and thus enables a shortened communications period.

In addition, at step 22, all of the respective specific display content in the prioritized notification information table 63 may be displayed in the order of priority on the liquid crystal display 25. An updated portion of the map information corresponding to the specific display content selected by the user may then be displayed in a distinguishable manner on the liquid crystal display 25. Thus, the user can confirm all the specific display content for the updated portion of the navigation map information 38 that was updated by the received difference data, and can easily confirm the desired updated portion.

Further, the CPU 11 of the map information distribution center 3 may create the prioritized notification information table 63 based on the road notification information table 61 and the object notification information table 62 where respective scores are stored, and subsequently send the difference data and the prioritized notification information table 63 to the navigation device 2. However, the CPU 11 may instead send the difference data, and the road notification information table 61 and the object notification information table 62 where the respective scores are stored, to the navigation device 2.

Figure 19:
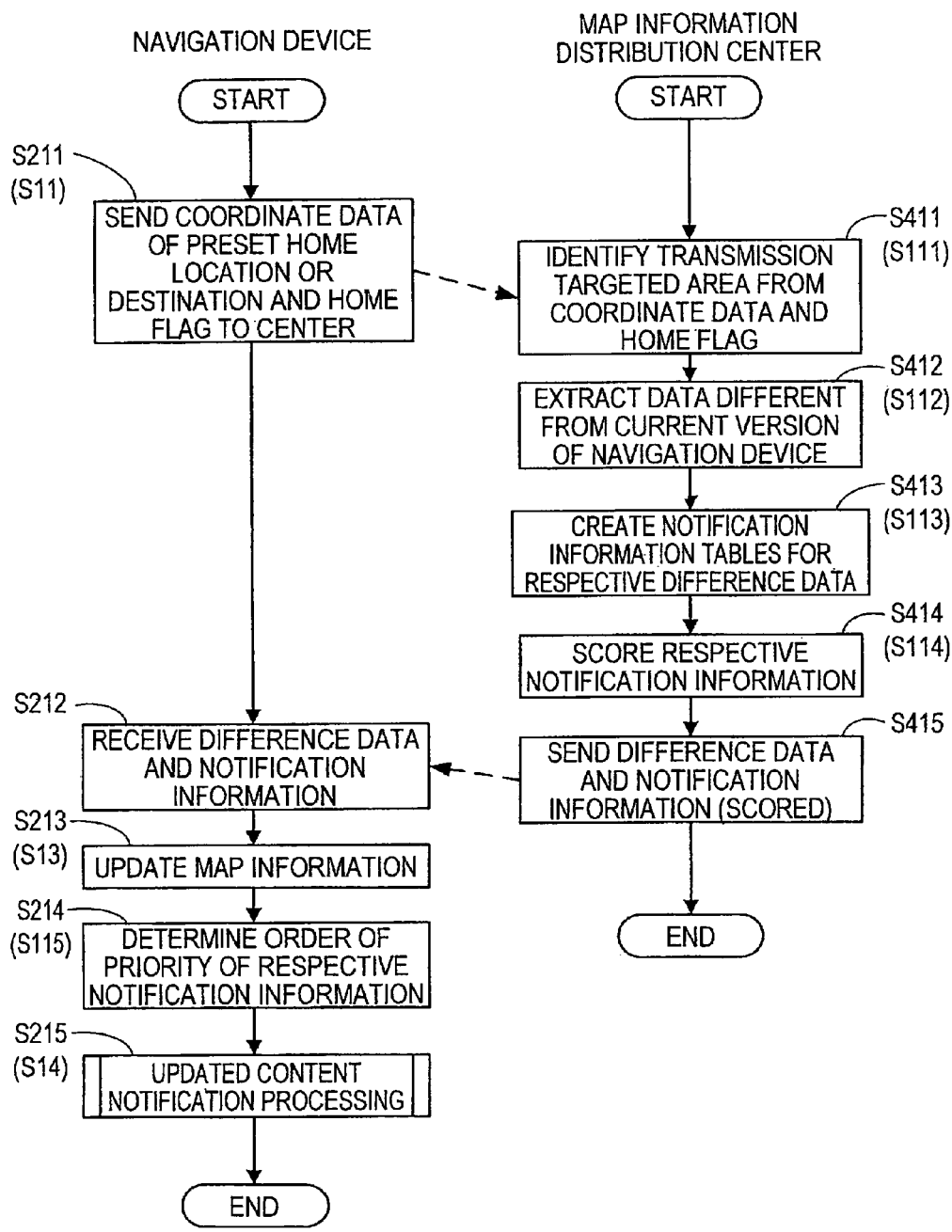
FIG. 19 is a main flowchart showing map information update method in the map information distribution system according to another example.

For example, as shown in FIG. 19, first, the CPU 41 of the navigation device 2 executes at S211 the processing at S11 above.

Meanwhile, as shown in FIG. 19, the CPU 11 of the map information distribution center 3 executes at S411 to S414 the processing at S111 to S114 above.

Then at S415, the CPU 11 reads out the difference data for the targeted area extracted at S412 from the RAM 12, and sends the difference data to the navigation device 2. At the same time, from the RAM 12 the CPU 11 reads out the road notification information table 61 (see FIG. 10) that stores the road rank scores, the updated content scores, and the distance scores, and reads out the object notification information table 62 (see FIG. 11) that stores the notification importance and the distance scores, which were created at S414. The CPU 11 then sends the tables to the navigation device 2 that corresponds to the navigation ID. Thereafter, the CPU 11 changes the current versions of the respective sections in the targeted area of the navigation device 2 that are stored in the navigation update history database 15 to the newest versions, and subsequently ends the processing.

Meanwhile, as shown in FIG. 19, at S212 the CPU 41 of the navigation device 2 may receive the difference data for the targeted area (which measures 80 square kilometers centered on the preset home location or 10 square kilometers centered on the destination), the road notification information table 61, which stores the road rank scores, the updated content scores and distance scores, and the object notification information table 62, which stores the notification importance and the distance scores, from the map information distribution center 3 via the communications unit 27. In such case, the CPU 41 stores the difference data, the road notification information table 61, and the object notification information table 62 in the RAM 42.

Next at S213, the CPU 41 executes the processing at S13 above.

At S214, the CPU 41 executes the processing at S115 above. Specifically, the CPU 41 reads out the respective score numbers for the road rank scores, the updated content scores, and the distance scores of the respective notification information pertaining to roads, which are stored in the road notification information table 61. The respective score numbers are squared and added together to calculate total score numbers, which are stored in the RAM 42.

The CPU 41 then extracts notification information whose specific display content relates to the new construction or extension of roads from the road notification information table 61, and sorts the total score numbers in a descending order of priority so that the notification information with the smallest total score number comes first. Thereafter, in the prioritized notification information table 63 (see FIG. 14) stored in the RAM 42, "Road" is stored in "Category"; the sorted order is stored in "Order of Priority"; and the specific display content of the respective notification information is stored in the sorted order.

Next, the CPU 41 extracts notification information whose specific display content relates to tolls from the road notification information table 61, and sorts the total score numbers in a descending order of priority so that the notification information with the smallest total score number comes first. Thereafter, in the prioritized notification information table 63 (see FIG. 14), "Toll" is stored in "Category" after the "Road" notification information; the sorted order, which continues the order of the "Road" notification information, is stored in "Order of Priority"; and the specific display content of the respective notification information is stored in the sorted order.

Next, the CPU 41 reads out the respective score numbers for the notification importance and the distance scores of the respective notification information pertaining to objects, which are stored in the object notification information table 62. The respective score numbers are squared and added together to calculate total score numbers, which are stored in the RAM 42.

The CPU 41 then sorts the total score numbers of the respective notification information of the object notification information table 62 in a descending order of priority so that the notification information with the smallest total score number comes first. Thereafter, in the prioritized notification information table 63 (see FIG. 14), "Object" is stored in "Category" after the "Toll" notification information; the sorted order, which continues the order of the "Toll" notification information, is stored in "Order of Priority"; and the specific display content of the respective notification information is stored in the sorted order.

Accordingly, the CPU 41 of the navigation device 2 at S214 creates the prioritized notification information table 63 that was created at S115 above, and stores the prioritized notification information table 63 in the RAM 42.

Next at 5215, the CPU 41 executes the sub processing (see FIG. 19) for updated content notification processing that was executed at S14 above, and then ends the processing.

Thus, regarding the respective specific display content of the road notification information table 61 and the object notification information table 62 sent to the navigation device 2 from the map information distribution center 3, specific display content pertaining to the road rank, road changed content, and object content is selected based on the distance priority table 51, the road rank priority table 52, the updated content priority table 53,

The invention claimed is:

1. A map information distribution system comprising:
a navigation device that updates map information based on received update information; and
a map information distribution center that distributes the update information to the navigation device;

the navigation device comprising:
  a first controller specifically configured to:
    send update request information for requesting the update information of the map information to the map information distribution center;
    detect a host vehicle state;
    set a destination; and
    store a preset update point in a memory; and
    send update request information that requests the update information for the map information of a first region, which is centered on the update point, to the map information distribution center if the host vehicle state is engine start-up, and send update request information that requests the update information for the map information of a second region, which is centered on the destination, to the map information distribution center if the host vehicle state is setting of the destination; and
the map information distribution center comprising:
  a second controller specifically configured to:
    receive the update request information;
    obtain the update information corresponding to the received update request information;
    obtain updated content corresponding to the obtained update information;
    assign a score to the updated content based on factor information corresponding to the obtained updated content;
    assign an order of priority to the respective updated content based on the scores assigned to the respective updated content; and
    distribute the update information and the prioritized updated content to the navigation device;
  wherein the first controller is specifically configured to update the map information based on the received update information, and notify a user of the navigation device of the received updated content based on the order of priority assigned to the updated content.

2. The map information distribution system according to claim 1, wherein:
  the second controller is specifically configured to send the update information and the prioritized updated content to the navigation device based on the order of priority.

3. The map information distribution system according to claim 1, wherein if the updated content pertains to a road, then the factor information includes a road rank classification, road changed content, and a distance from a predetermined point.

4. The map information distribution system according to claim 1, wherein if the updated content pertains to an object, then the factor information includes a level of importance for notifying a user of the navigation device of the object and a distance from a predetermined point.

5. A map information distribution method wherein a map information distribution center distributes, to a navigation device that updates map information based on received update information, the update information, the method comprising:
  sending update request information for requesting the update information of the map information to the map information distribution center from the navigation device by:
    detecting a host vehicle state;
    setting a destination;
    storing a preset update point in a memory in the navigation device;
    sending update request information that requests the update information for the map information of a first region, which is centered on the update point, to the map information distribution center in response to an indication that the host vehicle state is engine start-up; and
    sending update request information that requests the update information for the map information of a second region, which is centered on the destination, to the map information distribution center in response to an indication that the host vehicle state is setting of the destination;
  receiving the update request information sent by the navigation device;
  obtaining the update information corresponding to the update request information;
  obtaining updated content corresponding to the update information;
  assigning a score to the updated content based on factor information corresponding to the updated content;
  assigning an order of priority to the respective updated content based on the scores assigned to the respective updated content;
  distributing the update information and the prioritized updated content from the information distribution center to the navigation device;
  receiving the update information and the prioritized updated content;
  updating the map information based on the update information; and
  notifying a user of the navigation device of the received updated content based on the order of priority assigned to the updated content.

* * * * *